(12) United States Patent
Kim et al.

(10) Patent No.: US 9,639,177 B2
(45) Date of Patent: May 2, 2017

(54) MOBILE TERMINAL AND METHOD FOR CONTROLLING THE SAME

(71) Applicant: LG ELECTRONICS INC., Seoul (KR)

(72) Inventors: Samsick Kim, Seoul (KR); Seojin Lee, Seoul (KR); Donghwan Yu, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 61 days.

(21) Appl. No.: 14/552,162

(22) Filed: Nov. 24, 2014

(65) Prior Publication Data

US 2016/0085319 A1 Mar. 24, 2016

(30) Foreign Application Priority Data

Sep. 18, 2014 (KR) ........................ 10-2014-0124505

(51) Int. Cl.
*G06F 3/0346* (2013.01)
*G06F 3/0487* (2013.01)
(Continued)

(52) U.S. Cl.
CPC .......... *G06F 3/0346* (2013.01); *G06F 1/1652* (2013.01); *G06F 3/017* (2013.01);
(Continued)

(58) Field of Classification Search
CPC ......... G06F 1/1652; G06F 2203/04102; G06F 3/04847; G06F 1/1641
See application file for complete search history.

(56) References Cited

U.S. PATENT DOCUMENTS

2010/0315399 A1 12/2010 Jacobson et al.
2012/0115422 A1 5/2012 Tziortzis et al.
(Continued)

FOREIGN PATENT DOCUMENTS

EP 2538639 12/2012
EP 2597558 5/2013
EP 2669771 12/2013

OTHER PUBLICATIONS

Khalilbeigi, et al., "FoldMe: Interacting with Double-sided Foldable Displays," Proceedings of the Sixth International Conference on Tangible, Embedded and Embodied Interaction, TEI '12, XP055047587, Feb. 2012, pp. 33-40.
(Continued)

*Primary Examiner* — Gerald Johnson
(74) *Attorney, Agent, or Firm* — Lee, Hong, Degerman, Kang & Waimey

(57) ABSTRACT

A mobile terminal is provided that is capable of effectively displaying information to users by utilizing characteristics of a flexible display unit. The mobile terminal includes a flexible display unit configured to display image information on an entire screen; a sensing unit configured to sense a folded state of the flexible display unit; and a control unit configured to divide an entire screen of the flexible display unit into a plurality of screens based on a folded position, rearrange image information according to the plurality of divided screens, and display the rearranged image information on at least one of the plurality of divided screens.

20 Claims, 34 Drawing Sheets

(51) Int. Cl.
- *G06F 1/16* (2006.01)
- *G06F 3/01* (2006.01)
- *H04M 1/02* (2006.01)
- *G06F 3/0484* (2013.01)
- *G06T 3/40* (2006.01)
- *G09G 5/00* (2006.01)

(52) U.S. Cl.
CPC ........ *G06F 3/0487* (2013.01); *G06F 3/04847* (2013.01); *G06T 3/40* (2013.01); *G09G 5/003* (2013.01); *H04M 1/0266* (2013.01); *H04M 1/0268* (2013.01); *G06F 2203/04803* (2013.01); *G09G 2380/02* (2013.01); *H04M 1/0214* (2013.01)

(56) References Cited

U.S. PATENT DOCUMENTS

| | | | |
|---|---|---|---|
| 2012/0139815 A1* | 6/2012 | Aono | ............... G06F 1/1616 345/1.3 |
| 2012/0299813 A1 | 11/2012 | Kang et al. | |
| 2013/0145311 A1 | 6/2013 | Joo | |
| 2013/0215088 A1 | 8/2013 | Son et al. | |
| 2013/0321340 A1* | 12/2013 | Seo | ............... G06F 1/1641 345/174 |
| 2013/0321373 A1 | 12/2013 | Yoshizumi | |
| 2014/0049463 A1* | 2/2014 | Seo | ............... G06F 3/0487 345/156 |
| 2014/0049464 A1 | 2/2014 | Kwak et al. | |
| 2015/0227271 A1* | 8/2015 | Kang | ............... G06F 3/0482 715/781 |

OTHER PUBLICATIONS

European Patent Office Application Serial No. 14197161.4, Search Report dated Jul. 21, 2015, 14 pages.
European Patent Office Application Serial No. 14197161.4, Search Report dated Mar. 12, 2015, 7 pages.

* cited by examiner 7-2

7-3

MOBILE TERMINAL AND METHOD FOR CONTROLLING THE SAME

CROSS-REFERENCE TO RELATED APPLICATIONS

Pursuant to 35 U.S.C. §119(a), this application claims the benefit of earlier filing date and right of priority to Korean Application No. 10-2014-0124505, filed on Sep. 18, 2014, the contents of which is incorporated by reference herein in its entirety.

Field of the Invention

The present invention relates to a mobile terminal and a method for controlling the same.

Description of the Conventional Art

Recently, a mobile terminal (portable terminal) is developed as a device which is portable and which has more than one function such as a voice and image call function, an information input/output function, a data storage function, and the like.

SUMMARY OF THE INVENTION

To achieve objects of the present invention, there is provided a mobile terminal including: a flexible display unit configured to display image information on a whole screen; a sensing unit configured to sense a folded state of the flexible display unit; and a control unit configured to divide the whole screen of the flexible display unit into a plurality of screens based on a folded position, rearrange the displayed image information according to the plurality of divided screens, and display the rearranged image information on at least one screen among the plurality of divided screens.

In an embodiment of the present invention, the sensing unit may be configured to sense a folding direction of the flexible display unit, and the control unit may be configured to enlarge or contract the image information according to the folding direction of the flexible display unit.

In an embodiment of the present invention, the image data may be map data, and the control unit may be configured to indicate a starting spot on a first screen and a destination on a second screen among the plurality of screens when the flexible display unit is folded in a state where the map data has been indicated on the whole screen.

In an embodiment of the present invention, the control unit may be configured to display a first position on a first screen and a second position on a second screen among the plurality of screens when the flexible display unit is folded in a state where the map data has been displayed on the whole screen and the first position of the mobile terminal and the second position of another mobile terminal have been sensed.

In an embodiment of the present invention, the control unit may be configured to display a first calendar on a first screen and a second calendar on a second screen among the plurality of screens when the flexible display unit is folded in a state where the first calendar has been displayed on the whole screen.

In an embodiment of the present invention, the control unit may be configured to display only the first calendar on the whole screen when the flexible display unit is refolded in a state where the first calendar has been displayed on the first screen and the second calendar has been displayed on the second screen.

In an embodiment of the present invention, the control unit may be configured to display a preview image on a first screen and at least one image related to a specific image on a second screen among the plurality of divided screens when the specific image is selected within the preview image and at the same time the flexible display unit is folded in a state where the preview image captured by a camera has been displayed on the whole screen.

In an embodiment of the present invention, the control unit may be configured to display a recently-captured image on the whole screen or one screen among the plurality of divided screens when the flexible display unit is folded at a preset angle within a first preset time in a state where a preview image captured by a camera has been displayed on the whole screen.

In an embodiment of the present invention, the control unit may be configured to display an image captured at a current position on the whole screen or one screen among the plurality of divided screens when the flexible display unit is folded at a preset angle within a second preset time in a state where the preview image has been displayed on the whole screen.

In an embodiment of the present invention, the flexible display unit may include first through third display regions, and the control unit may be configured to turn off the screens of the first and second display regions and display a preview image on the third display region when the first and second display regions are folded in a state where the preview image captured by the camera has been displayed on the first through third display regions.

In an embodiment of the present invention, the control unit may be configured to display the preview image only on the third display region when the first display region is folded in a preset pattern in a state where the third display region has been touched.

In an embodiment of the present invention, the control unit may be configured to display a setting menu of the mobile terminal on the flexible display unit, and change a setting value of the setting menu according to a folding angle of the flexible display unit when the folding angle of the flexible display unit is changed in a state where the setting menu has been touched.

In an embodiment of the present invention, the control unit may be configured to display a camera setting menu of the mobile terminal on the flexible display unit, and change a setting value of the camera setting menu according to a folding angle of the flexible display unit when the folding angle of the flexible display unit is changed in a state where the camera setting menu has been touched.

In an embodiment of the present invention, the control unit may be configured to change a volume of music or a video according to a folding angle of the flexible display unit when the folding angle of the flexible display unit is changed in a state where a volume control icon of the music or the video displayed on the flexible display unit has been touched.

In an embodiment of the present invention, the flexible display unit may include a plurality of display regions, and the control unit may be configured to display information related to an application on at least one of the plurality of display regions when the second and third display regions are folded or unfolded in a state where an icon of the application displayed on the first display region among the plurality of display regions has been touched.

In an embodiment of the present invention, the control unit may be configured to display an icon to transmit or store a displayed user's input on a third display region of the flexible display unit when first and second display regions are folded in a state where the user's input has been displayed on the first and second display regions of the flexible display unit.

In an embodiment of the present invention, the control unit may be configured to output a preset alarm sound or alarm image on at least one display region among the plurality of display regions when a folding angle of the flexible display unit is similar to or equal to a preset limit folding angle.

In an embodiment of the present invention, the control unit may be configured to output a preset alarm sound and display an alarm image on at least one of the plurality of divided screens when a folding angle of the flexible display unit is similar to or equal to a preset limit folding angle.

In an embodiment of the present invention, the mobile terminal may further include a vibration motor provided at a folded position of the flexible display unit, and the control unit may be configured to drive the vibration motor when a folding angle of the flexible display unit is similar to or equal to a preset limit folding angle.

To achieve objects of the present invention, there is also provided a control method of a mobile terminal including: displaying image information on a whole screen of a flexible display unit; sensing a folded state of the flexible display unit; dividing the whole screen of the flexible display unit into a plurality of screens based on a position where the folded state has been sensed; rearranging the displayed image information according to the plurality of divided screens; and displaying the rearranged image information on at least one of the plurality of divided screens.

DETAILED DESCRIPTION OF THE PREFERRED EMBODIMENT

Description will now be given in detail of the exemplary embodiments, with reference to the accompanying drawings. For the sake of brief description with reference to the drawings, the same or equivalent components will be provided with the same reference numbers, and description thereof will not be repeated. A suffix "module" or "unit" used for constituent elements disclosed in the following description is merely intended for easy description of the specification, and the suffix itself does not give any special meaning or function. In describing the present invention, if a detailed explanation for a related known function or construction is considered to unnecessarily divert the gist of the present disclosure, such explanation is omitted but would be understood by those skilled in the art. The accompanying drawings are used to help easily understood the technical idea of the present invention and it should be understood that the idea of the present disclosure is not limited by the accompanying drawings.

The mobile terminal described in the description of the embodiments of the present invention may include a portable phone, a smart phone, a laptop computer, a terminal for digital broadcast, personal digital assistances (PDA), a portable multimedia player (PMP), navigation, and the like. However, it will be understood to one of the ordinary skill in the art that the structure thereof according to the embodiments of the present invention described in the description may be applied to a fixed-type terminal such as a digital TV, a desktop computer, and the like, except a case where it is applied only to a mobile terminal.

Figure 1:
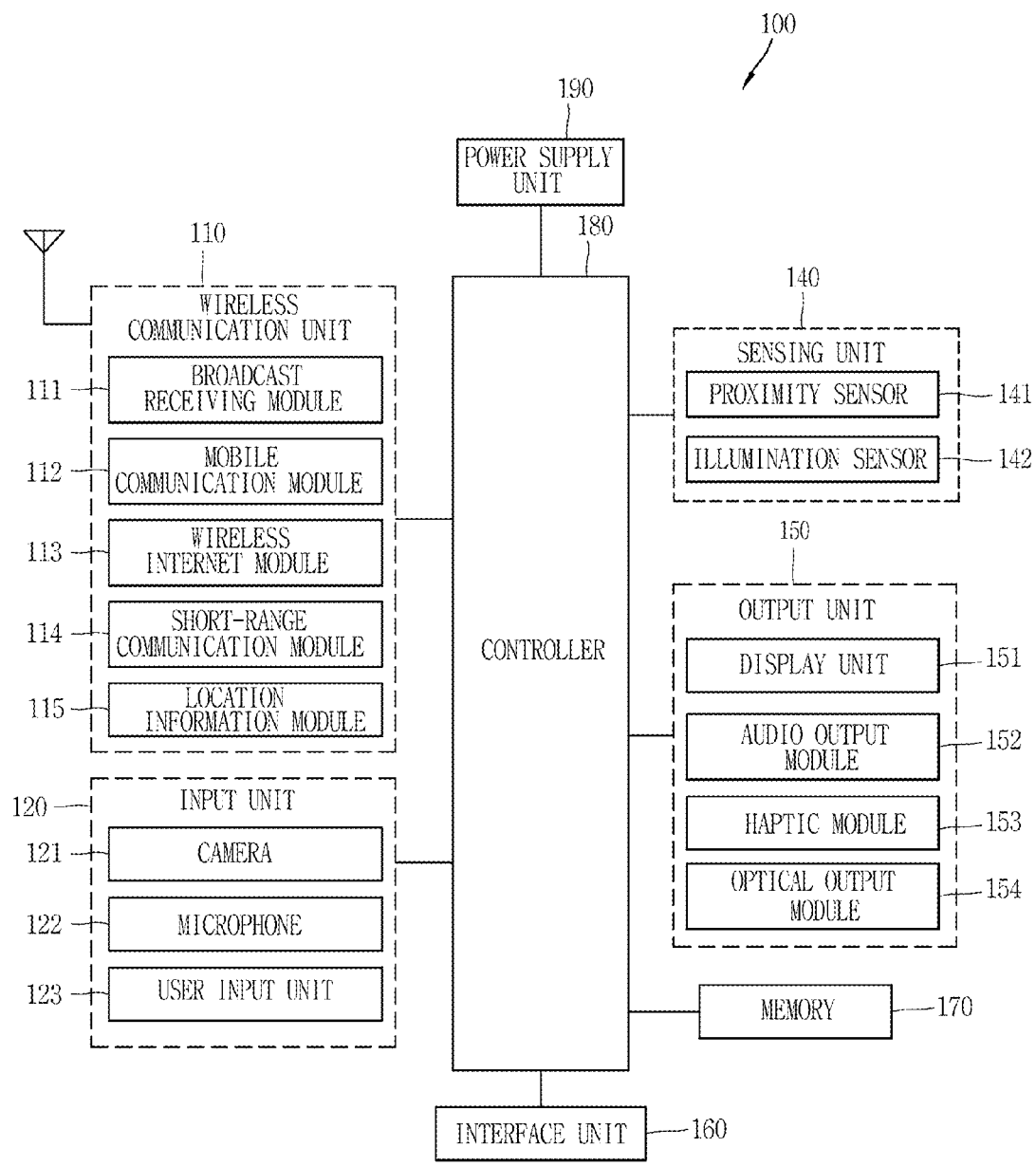
FIG. 1 is a block diagram illustrating a mobile terminal according to an embodiment of the present invention.

FIG. 1 is a block diagram illustrating a structure of the mobile terminal according to the embodiments of the present invention.

The mobile terminal according to the embodiments of the present invention may control devices connected to the mobile terminal.

The mobile terminal 100 may include a wireless communication unit 110, an input unit 120, a sensing unit 140, an output unit 150, an interface unit 160, a memory unit 170, a control unit 180, and a power supply unit 190. As the elements, as shown in FIG. 1, are not essential parts to implement a mobile terminal, the mobile terminal according to the embodiments of the present invention may include more than or less than parts as described above.

More specifically, the wireless communication unit 110 among the above mentioned elements may include more than one module which is configured to implement a wireless communication between the mobile terminal 100 and a wireless communication system, between the mobile terminal 100 and other mobile terminals, or between the mobile terminal 100 and an external server. Further, the wireless communication unit 110 may include more than one module configured to connect the mobile terminal 100 to more than one networks.

The wireless communication unit 110 may include at least one of a broadcast receiving module 111, a mobile communication module 112, a wireless internet module 113, a near field communication module 114, and a position information module 115.

The input unit 120 may include a camera 121 configured to input an image signal, or an image input unit, a microphone 122 configured to input an audio signal, or an audio input unit, a user's input unit 123 (for instance, a touch key, a push key, and the like) configured to receive information from a user, and the like. Voice data or image data collected in the input unit 120 may be analyzed and processed as a user's control command.

The sensing unit 140 may include more than one sensor configured to sense at least one of information within a mobile terminal, peripheral environment information surrounding a mobile terminal, and user's information. For example, the sensing unit 140 may include at least more than one of a proximity sensor 141, an illumination sensor 142, a bend sensor, a touch sensor, an acceleration sensor, a magnetic sensor, a G-sensor, a gyroscope sensor, a motion sensor, an RGB sensor, an infrared sensor, a finger scan sensor, an ultrasonic sensor, an optical sensor (for instance, refer to the camera 121), a microphone (refer to 122), a battery gauge, an environment sensor (for instance, a barometer, a hygrometer, a thermometer, a radioactivity sensor, a thermo sensor, a gas sensor, and the like), a chemical sensor (for instance, an electronic nose, a healthcare sensor, a bio-recognition sensor, and the like), a pulse wave sensor, and the like. Meanwhile, the mobile terminal according to the embodiments of the present invention may utilize information by combining the information sensed by more than two sensors among the above sensors.

The bend sensor is a device which converts information on a folded or bent position (including direction and angle) of the flexible display unit 151 into an electrical signal. Further, the bend sensor may output different signals according to the extent that the flexible display unit 151 is folded or bent. Thus, the control unit 180 may recognize a folded or bent position (direction and angle) of the flexible display unit 151 using an output value of the bend sensor. In general, the bend sensor is disposed close to and uniformly distributed in the flexible display unit 151. That is, the bend sensor is configured to output different signals to the control unit 180 according to the folding direction (inward folding or outward folding) and folding angle of the flexible display unit 151, and the control unit 180 may detect the folding direction and angle of the flexible display unit based on the signals output from the bend sensor.

The output unit 150 is typically configured to output various types of information, such as audio, video, tactile output, and the like. The output unit 150 is shown having a display unit 151, an audio output module 152, a haptic module 153, and an optical output module 154.

The display unit 151 may have an inter-layered structure or an integrated structure with a touch sensor in order to facilitate a touch screen. The touch screen may provide an output interface between the mobile terminal 100 and a user, as well as function as the user input unit 123 which provides an input interface between the mobile terminal 100 and the user.

The interface unit 160 serves as an interface with various types of external devices that can be coupled to the mobile terminal 100. The interface unit 160, for example, may include any of wired or wireless ports, external power supply ports, wired or wireless data ports, memory card ports, ports for connecting a device having an identification module, audio input/output (I/O) ports, video I/O ports, earphone ports, and the like. In some cases, the mobile terminal 100 may perform assorted control functions associated with a connected external device, in response to the external device being connected to the interface unit 160.

The memory 170 is typically implemented to store data to support various functions or features of the mobile terminal 100. For instance, the memory 170 may be configured to store application programs executed in the mobile terminal 100, data or instructions for operations of the mobile terminal 100, and the like. Some of these application programs may be downloaded from an external server via wireless communication. Other application programs may be installed within the mobile terminal 100 at time of manufacturing or shipping, which is typically the case for basic functions of the mobile terminal 100 (for example, receiving a call, placing a call, receiving a message, sending a message, and the like). It is common for application programs to be stored in the memory 170, installed in the mobile terminal 100, and executed by the controller 180 to perform an operation (or function) for the mobile terminal 100.

The controller 180 typically functions to control overall operation of the mobile terminal 100, in addition to the operations associated with the application programs. The controller 180 may provide or process information or functions appropriate for a user by processing signals, data, information and the like, which are input or output by the various components depicted in FIG. 1A, or activating application programs stored in the memory 170. As one example, the controller 180 controls some or all of the components illustrated in FIGS. 1A-1C according to the execution of an application program that have been stored in the memory 170.

The power supply unit 190 can be configured to receive external power or provide internal power in order to supply appropriate power required for operating elements and components included in the mobile terminal 100. The power supply unit 190 may include a battery, and the battery may be configured to be embedded in the terminal body, or configured to be detachable from the terminal body.

Referring still to FIG. 1A, various components depicted in this figure will now be described in more detail. Regarding the wireless communication unit 110, the broadcast receiving module 111 is typically configured to receive a broadcast signal and/or broadcast associated information from an external broadcast managing entity via a broadcast channel. The broadcast channel may include a satellite channel, a terrestrial channel, or both. In some embodiments, two or more broadcast receiving modules 111 may be utilized to facilitate simultaneously receiving of two or more broadcast channels, or to support switching among broadcast channels.

The mobile communication module 112 can transmit and/or receive wireless signals to and from one or more network entities. Typical examples of a network entity include a base station, an external mobile terminal, a server, and the like. Such network entities form part of a mobile communication network, which is constructed according to technical standards or communication methods for mobile communications (for example, Global System for Mobile Communication (GSM), Code Division Multi Access (CDMA), CDMA2000 (Code Division Multi Access 2000), EV-DO (Enhanced Voice-Data Optimized or Enhanced Voice-Data Only), Wideband CDMA (WCDMA), High Speed Downlink Packet access (HSDPA), HSUPA (High Speed Uplink Packet Access), Long Term Evolution (LTE), LTE-A (Long Term Evolution-Advanced), and the like).

Examples of wireless signals transmitted and/or received via the mobile communication module 112 include audio call signals, video (telephony) call signals, or various formats of data to support communication of text and multimedia messages.

The wireless Internet module 113 is configured to facilitate wireless Internet access. This module may be internally or externally coupled to the mobile terminal 100. The wireless Internet module 113 may transmit and/or receive wireless signals via communication networks according to wireless Internet technologies.

Examples of such wireless Internet access include Wireless LAN (WLAN), Wireless Fidelity (Wi-Fi), Wi-Fi Direct, Digital Living Network Alliance (DLNA), Wireless Broadband (WiBro), Worldwide Interoperability for Microwave Access (WiMAX), High Speed Downlink Packet Access (HSDPA), Long Term Evolution (LTE), and the like. The wireless Internet module 113 may transmit/receive data according to one or more of such wireless Internet technologies, and other Internet technologies as well.

In some embodiments, when the wireless Internet access is implemented according to, for example, WiBro, HSDPA, HSUPA, GSM, CDMA, WCDMA, LTE, LTE-A and the like, as part of a mobile communication network, the wireless Internet module 113 performs such wireless Internet access. As such, the Internet module 113 may cooperate with, or function as, the mobile communication module 112.

The short-range communication module 114 is configured to facilitate short-range communications. Suitable technologies for implementing such short-range communications include BLUETOOTH™, Radio Frequency IDentification (RFID), Infrared Data Association (IrDA), Ultra-WideBand (UWB), ZigBee, Near Field Communication (NFC), Wireless-Fidelity (Wi-Fi), Wi-Fi Direct, Wireless USB (Wireless Universal Serial Bus), and the like. The short-range communication module 114 in general supports wireless communications between the mobile terminal 100 and a wireless communication system, communications between the mobile terminal 100 and another mobile terminal 100, or communications between the mobile terminal and a network where another mobile terminal 100 (or an external server) is located, via wireless area networks. One example of the wireless area networks is a wireless personal area networks.

In some embodiments, another mobile terminal (which may be configured similarly to mobile terminal 100) may be a wearable device, for example, a smart watch, a smart glass or a head mounted display (HMD), which is able to exchange data with the mobile terminal 100 (or otherwise cooperate with the mobile terminal 100). The short-range communication module 114 may sense or recognize the wearable device, and permit communication between the wearable device and the mobile terminal 100. In addition, when the sensed wearable device is a device which is authenticated to communicate with the mobile terminal 100, the controller 180, for example, may cause transmission of data processed in the mobile terminal 100 to the wearable device via the short-range communication module 114. Hence, a user of the wearable device may use the data processed in the mobile terminal 100 on the wearable device. For example, when a call is received in the mobile terminal 100, the user may answer the call using the wearable device. Also, when a message is received in the mobile terminal 100, the user can check the received message using the wearable device.

The location information module 115 is generally configured to detect, calculate, derive or otherwise identify a position of the mobile terminal. As an example, the location information module 115 includes a Global Position System (GPS) module, a Wi-Fi module, or both. If desired, the location information module 115 may alternatively or additionally function with any of the other modules of the wireless communication unit 110 to obtain data related to the position of the mobile terminal.

As one example, when the mobile terminal uses a GPS module, a position of the mobile terminal may be acquired using a signal sent from a GPS satellite. As another example, when the mobile terminal uses the Wi-Fi module, a position of the mobile terminal can be acquired based on information related to a wireless access point (AP) which transmits or receives a wireless signal to or from the Wi-Fi module.

The input unit 120 may be configured to permit various types of input to the mobile terminal 120. Examples of such input include audio, image, video, data, and user input. Image and video input is often obtained using one or more cameras 121. Such cameras 121 may process image frames of still pictures or video obtained by image sensors in a video or image capture mode. The processed image frames can be displayed on the display unit 151 or stored in memory 170. In some cases, the cameras 121 may be arranged in a matrix configuration to permit a plurality of images having various angles or focal points to be input to the mobile terminal 100. As another example, the cameras 121 may be located in a stereoscopic arrangement to acquire left and right images for implementing a stereoscopic image.

The microphone 122 is generally implemented to permit audio input to the mobile terminal 100. The audio input can be processed in various manners according to a function being executed in the mobile terminal 100. If desired, the microphone 122 may include assorted noise removing algorithms to remove unwanted noise generated in the course of receiving the external audio.

The user input unit 123 is a component that permits input by a user. Such user input may enable the controller 180 to control operation of the mobile terminal 100. The user input unit 123 may include one or more of a mechanical input element (for example, a key, a button located on a front and/or rear surface or a side surface of the mobile terminal 100, a dome switch, a jog wheel, a jog switch, and the like), or a touch-sensitive input, among others. As one example, the touch-sensitive input may be a virtual key or a soft key, which is displayed on a touch screen through software processing, or a touch key which is located on the mobile terminal at a location that is other than the touch screen. On the other hand, the virtual key or the visual key may be displayed on the touch screen in various shapes, for example, graphic, text, icon, video, or a combination thereof.

The user input unit 123 may recognize information sensed by the sensing unit 140, as well as by the aforementioned mechanical input means and touch type input means, as information input from a user. Accordingly, the controller 180 can control an operation of the mobile terminal 100 corresponding to the sensed information.

The sensing unit 140 is generally configured to sense one or more of internal information of the mobile terminal, surrounding environment information of the mobile terminal, user information, or the like. The controller 180 generally cooperates with the sending unit 140 to control operation of the mobile terminal 100 or execute data processing, a function or an operation associated with an application program installed in the mobile terminal based on the sensing provided by the sensing unit 140. The sensing unit 140 may be implemented using any of a variety of sensors, some of which will now be described in more detail.

The proximity sensor 141 may include a sensor to sense presence or absence of an object approaching a surface, or an object located near a surface, by using an electromagnetic field, infrared rays, or the like without a mechanical contact. The proximity sensor 141 may be arranged at an inner region of the mobile terminal covered by the touch screen, or near the touch screen.

The proximity sensor 141, for example, may include any of a transmissive type photoelectric sensor, a direct reflective type photoelectric sensor, a mirror reflective type photoelectric sensor, a high-frequency oscillation proximity sensor, a capacitance type proximity sensor, a magnetic type proximity sensor, an infrared rays proximity sensor, and the like. When the touch screen is implemented as a capacitance type, the proximity sensor 141 can sense proximity of a pointer relative to the touch screen by changes of an electromagnetic field, which is responsive to an approach of an object with conductivity. In this case, the touch screen (touch sensor) may also be categorized as a proximity sensor.

The term "proximity touch" will often be referred to herein to denote the scenario in which a pointer is positioned to be proximate to the touch screen without contacting the touch screen. The term "contact touch" will often be referred to herein to denote the scenario in which a pointer makes physical contact with the touch screen. For the position corresponding to the proximity touch of the pointer relative to the touch screen, such position will correspond to a position where the pointer is perpendicular to the touch screen. The proximity sensor 141 may sense proximity touch, and proximity touch patterns (for example, distance, direction, speed, time, position, moving status, and the like).

In general, controller 180 processes data corresponding to proximity touches and proximity touch patterns sensed by the proximity sensor 141, and cause output of visual information on the touch screen. In addition, the controller 180 can control the mobile terminal 100 to execute different operations or process different data according to whether a touch with respect to a point on the touch screen is either a proximity touch or a contact touch.

A touch sensor can sense a touch applied to the touch screen, such as display unit 151, using any of a variety of touch methods. Examples of such touch methods include a resistive type, a capacitive type, an infrared type, and a magnetic field type, among others.

As one example, the touch sensor may be configured to convert changes of pressure applied to a specific part of the display unit 151, or convert capacitance occurring at a specific part of the display unit 151, into electric input signals. The touch sensor may also be configured to sense not only a touched position and a touched area, but also touch pressure and/or touch capacitance. A touch object is generally used to apply a touch input to the touch sensor. Examples of typical touch objects include a finger, a touch pen, a stylus pen, a pointer, or the like.

When a touch input is sensed by a touch sensor, corresponding signals may be transmitted to a touch controller. The touch controller may process the received signals, and then transmit corresponding data to the controller 180. Accordingly, the controller 180 may sense which region of the display unit 151 is touched. Here, the touch controller may be a component separate from the controller 180, the controller 180, and combinations thereof.

In some embodiments, the controller 180 may execute the same or different controls according to a type of touch object that touches the touch screen or a touch key provided in addition to the touch screen. Whether to execute the same or different control according to the object which provides a touch input may be decided based on a current operating state of the mobile terminal 100 or a currently executed application program, for example.

The touch sensor and the proximity sensor may be implemented individually, or in combination, to sense various types of touches. Such touches includes a short (or tap) touch, a long touch, a multi-touch, a drag touch, a flick touch, a pinch-in touch, a pinch-out touch, a swipe touch, a hovering touch, and the like.

If desired, an ultrasonic sensor may be implemented to recognize position information relating to a touch object using ultrasonic waves. The controller 180, for example, may calculate a position of a wave generation source based on information sensed by an illumination sensor and a plurality of ultrasonic sensors. Since light is much faster than ultrasonic waves, the time for which the light reaches the optical sensor is much shorter than the time for which the ultrasonic wave reaches the ultrasonic sensor. The position of the wave generation source may be calculated using this fact. For instance, the position of the wave generation source may be calculated using the time difference from the time that the ultrasonic wave reaches the sensor based on the light as a reference signal.

The camera 121 typically includes at least one a camera sensor (CCD, CMOS etc.), a photo sensor (or image sensors), and a laser sensor.

Implementing the camera 121 with a laser sensor may allow detection of a touch of a physical object with respect to a 3D stereoscopic image. The photo sensor may be laminated on, or overlapped with, the display device. The photo sensor may be configured to scan movement of the physical object in proximity to the touch screen. In more detail, the photo sensor may include photo diodes and transistors at rows and columns to scan content received at the photo sensor using an electrical signal which changes according to the quantity of applied light. Namely, the photo sensor may calculate the coordinates of the physical object according to variation of light to thus obtain position information of the physical object.

The display unit 151 is generally configured to output information processed in the mobile terminal 100. For example, the display unit 151 may display execution screen information of an application program executing at the mobile terminal 100 or user interface (UI) and graphic user interface (GUI) information in response to the execution screen information.

In some embodiments, the display unit 151 may be implemented as a stereoscopic display unit for displaying stereoscopic images. A typical stereoscopic display unit may employ a stereoscopic display scheme such as a stereoscopic scheme (a glass scheme), an auto-stereoscopic scheme (glassless scheme), a projection scheme (holographic scheme), or the like.

The audio output module 152 is generally configured to output audio data. Such audio data may be obtained from any of a number of different sources, such that the audio data may be received from the wireless communication unit 110 or may have been stored in the memory 170. The audio data may be output during modes such as a signal reception mode, a call mode, a record mode, a voice recognition mode, a broadcast reception mode, and the like. The audio output module 152 can provide audible output related to a particular function (e.g., a call signal reception sound, a message reception sound, etc.) performed by the mobile terminal 100. The audio output module 152 may also be implemented as a receiver, a speaker, a buzzer, or the like.

A haptic module 153 can be configured to generate various tactile effects that a user feels, perceive, or otherwise experience. A typical example of a tactile effect generated by the haptic module 153 is vibration. The strength, pattern and the like of the vibration generated by the haptic module 153 can be controlled by user selection or setting by the controller. For example, the haptic module 153 may output different vibrations in a combining manner or a sequential manner.

Besides vibration, the haptic module 153 can generate various other tactile effects, including an effect by stimulation such as a pin arrangement vertically moving to contact skin, a spray force or suction force of air through a jet orifice or a suction opening, a touch to the skin, a contact of an electrode, electrostatic force, an effect by reproducing the sense of cold and warmth using an element that can absorb or generate heat, and the like.

The haptic module 153 can also be implemented to allow the user to feel a tactile effect through a muscle sensation such as the user's fingers or arm, as well as transferring the tactile effect through direct contact. Two or more haptic modules 153 may be provided according to the particular configuration of the mobile terminal 100.

An optical output module 154 can output a signal for indicating an event generation using light of a light source. Examples of events generated in the mobile terminal 100 may include message reception, call signal reception, a missed call, an alarm, a schedule notice, an email reception, information reception through an application, and the like.

A signal output by the optical output module 154 may be implemented in such a manner that the mobile terminal emits monochromatic light or light with a plurality of colors.

The signal output may be terminated as the mobile terminal senses that a user has checked the generated event, for example.

The interface unit 160 serves as an interface for external devices to be connected with the mobile terminal 100. For example, the interface unit 160 can receive data transmitted from an external device, receive power to transfer to elements and components within the mobile terminal 100, or transmit internal data of the mobile terminal 100 to such external device. The interface unit 160 may include wired or wireless headset ports, external power supply ports, wired or wireless data ports, memory card ports, ports for connecting a device having an identification module, audio input/output (I/O) ports, video I/O ports, earphone ports, or the like.

The identification module may be a chip that stores various information for authenticating authority of using the mobile terminal 100 and may include a user identity module (UIM), a subscriber identity module (SIM), a universal subscriber identity module (USIM), and the like. In addition, the device having the identification module (also referred to herein as an "identifying device") may take the form of a smart card. Accordingly, the identifying device can be connected with the terminal 100 via the interface unit 160.

When the mobile terminal 100 is connected with an external cradle, the interface unit 160 can serve as a passage to allow power from the cradle to be supplied to the mobile terminal 100 or may serve as a passage to allow various command signals input by the user from the cradle to be transferred to the mobile terminal there through. Various command signals or power input from the cradle may operate as signals for recognizing that the mobile terminal is properly mounted on the cradle.

The memory 170 can store programs to support operations of the controller 180 and store input/output data (for example, phonebook, messages, still images, videos, etc.). The memory 170 may store data related to various patterns of vibrations and audio which are output in response to touch inputs on the touch screen.

The memory 170 may include one or more types of storage mediums including a Flash memory, a hard disk, a solid state disk, a silicon disk, a multimedia card micro type, a card-type memory (e.g., SD or DX memory, etc), a Random Access Memory (RAM), a Static Random Access Memory (SRAM), a Read-Only Memory (ROM), an Electrically Erasable Programmable Read-Only Memory (EEPROM), a Programmable Read-Only memory (PROM), a magnetic memory, a magnetic disk, an optical disk, and the like. The mobile terminal 100 may also be operated in relation to a network storage device that performs the storage function of the memory 170 over a network, such as the Internet.

The controller 180 may typically control the general operations of the mobile terminal 100. For example, the controller 180 may set or release a lock state for restricting a user from inputting a control command with respect to applications when a status of the mobile terminal meets a preset condition.

The controller 180 can also perform the controlling and processing associated with voice calls, data communications, video calls, and the like, or perform pattern recognition processing to recognize a handwriting input or a picture drawing input performed on the touch screen as characters or images, respectively. In addition, the controller 180 can control one or a combination of those components in order to implement various exemplary embodiments disclosed herein.

The power supply unit 190 receives external power or provides internal power in order to supply the appropriate power required for operating respective elements and components included in the mobile terminal 100. The power supply unit 190 may include a battery, which is typically rechargeable or be detachably coupled to the terminal body for charging.

The power supply unit 190 may include a connection port. The connection port may be configured as one example of the interface unit 160 to which an external charger for supplying power to recharge the battery is electrically connected.

As another example, the power supply unit 190 may be configured to recharge the battery in a wireless manner without use of the connection port. In this example, the power supply unit 190 can receive power, transferred from an external wireless power transmitter, using at least one of an inductive coupling method which is based on magnetic induction or a magnetic resonance coupling method which is based on electromagnetic resonance.

In the present invention, information processed in the mobile terminal 100 may be displayed using a flexible display unit. Hereinafter, such flexible display unit will be explained in more detail with reference to the attached drawings.

Figure 2A:
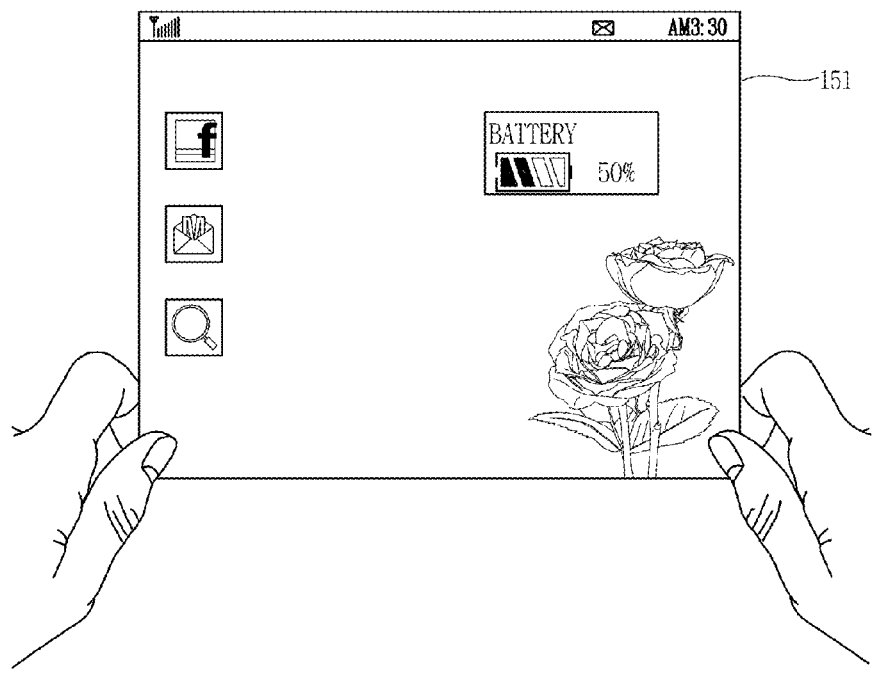
FIGS. 2A[a] through 2I are views schematically illustrating a flexible display unit included in a mobile terminal according to an embodiment of the present invention.
Figure 2A:
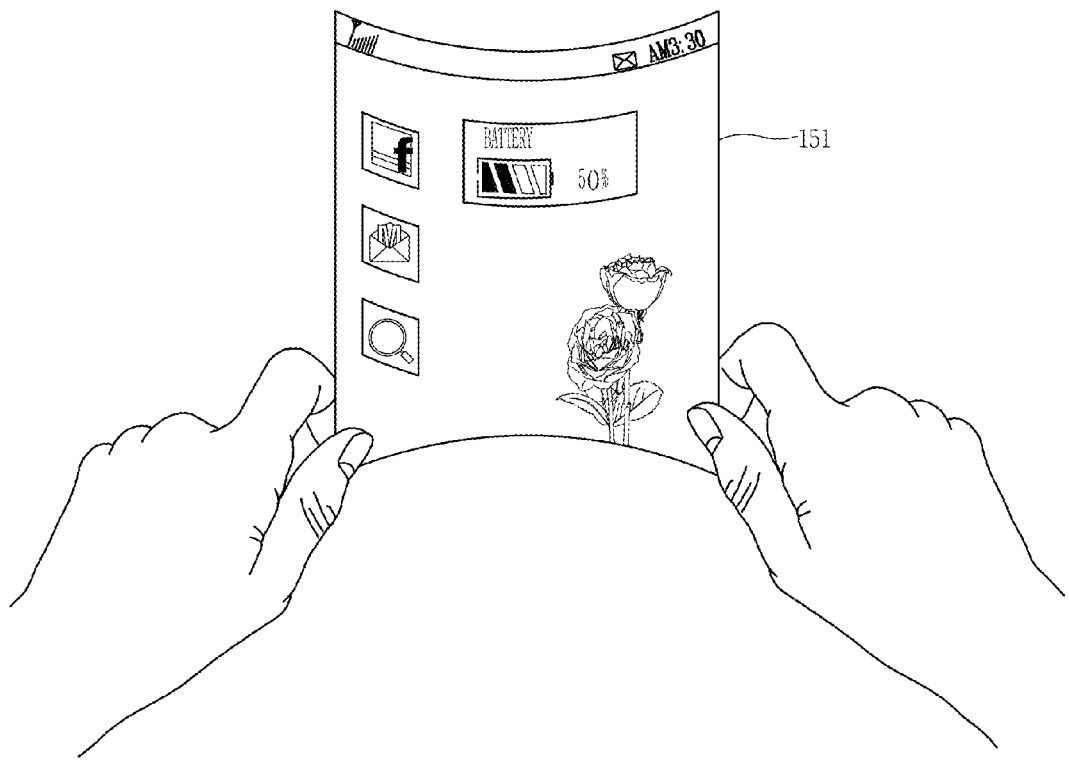
Figure 2B:
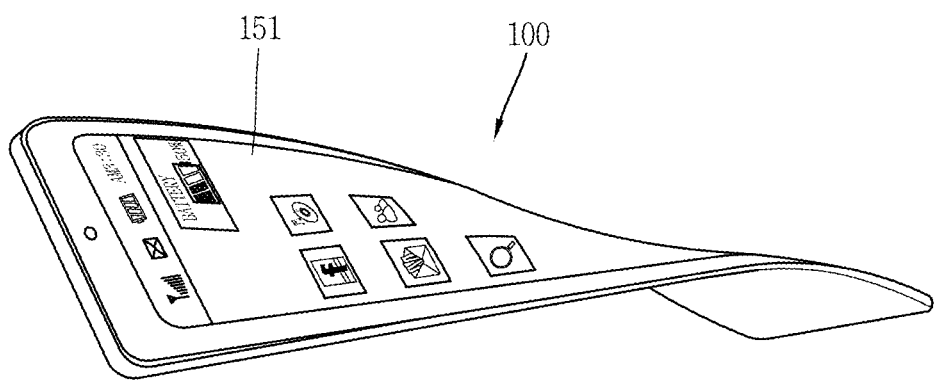
Figure 2C:
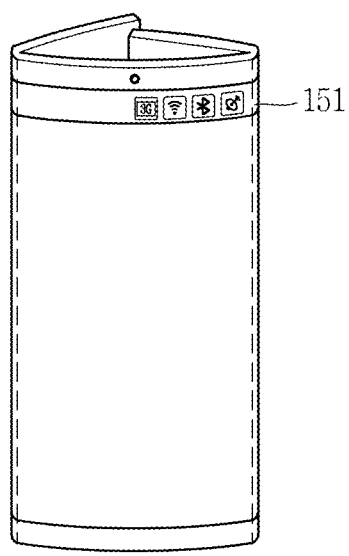
Figure 2D:
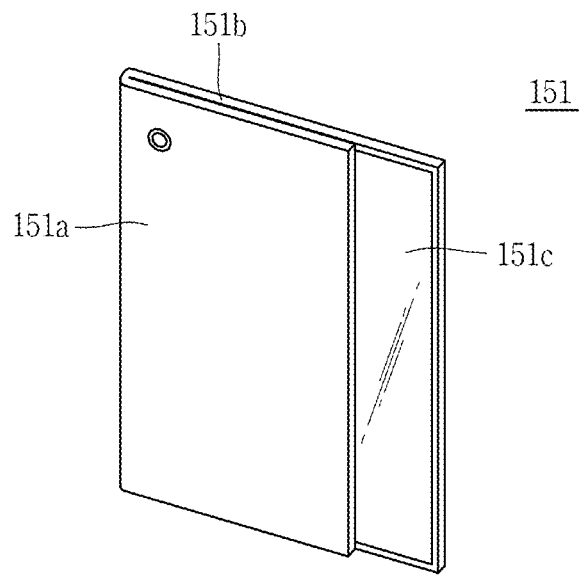
Figure 2E:
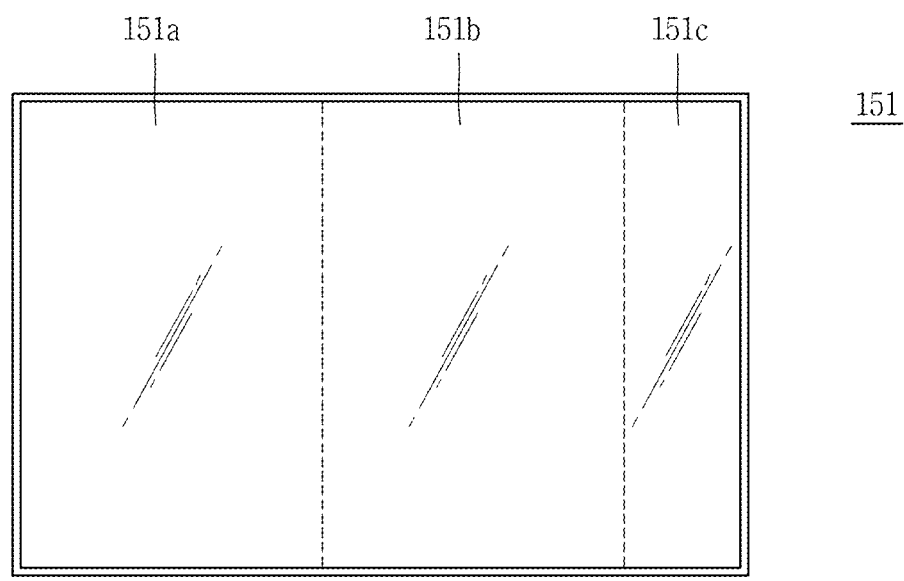

FIGS. 2A[a] through 2E are schematic views illustrating a flexible display unit included in the mobile terminal according to an embodiment of the present invention.

As shown in FIGS. 2A[a] through 2E, the flexible display unit 151 includes a display which may be bent, curved, twisted, folded, and rolled by an external force. Here, the flexible display unit 151 may include both a general flexible display and electronic paper.

Here, the general flexible display is a display which is configured to maintain the features of the existing flat display and means a light, unbroken and strong display which is manufactured on a thin and flexible substrate which may be bent, curved, rolled, and folded like paper.

Further, the electronic paper adopts a display technique which is applied with a characteristic of generally used ink, but has a differentiated point from a usual flat display in that it uses a reflective light. The electronic paper may change images or texts by using twist ball or via electrophoresis using capsule.

Meanwhile, as the sensing unit (181, refer to FIG. 1) is included in the mobile terminal together with the flexible display unit 151, it is possible to sense bending information of the flexible display unit 151. The term, 'bending' in the description may include all the meanings of 'curved', 'rolled', 'folded', 'bowed', and 'twisted'.

The sensing unit 181 may be disposed wholly or partially on the flexible display unit 151 and sense bending information of the flexible display unit 151. Here, the bending information of the flexible display unit 151 may include a bending direction, a bending degree, a bending position, a bending time of the flexible display 151, and an acceleration that the bent flexible display unit 151 returns to its original position, and may further include various information that may be sensible due to bending of the flexible display unit 151.

Under a state where the flexible display unit 151 is not bent (for instance, a state where the flexible display unit has an infinite radius of curvature, hereinafter referred to as 'a first state'), a display region of the flexible display unit 151 becomes a flat surface. Under a state where the flexible display unit 151 is bent by an external force in the 'first state' (for instance, a state where the flexible display unit has a limited radius of curvature, hereinafter referred to as 'a second state'), the display region of the flexible display unit 151 may become a curved surface.

The sensing unit 181 may be configured to sense an inclined state of the flexible display unit 151. As an example, the sensing unit 181 may include an accelerometer (or a gyro sensor). Namely, when the flexible display unit 151 is inclined under the first and second states, the sensing unit 181 senses an inclined state of the flexible display unit 151.

Further, the control unit 180 may be configured to create a control signal to change information displayed on the flexible display unit 151, or to control an operation of the mobile terminal, based on at least one of bending information and inclination information of the flexible display unit sensed by the sensing unit 181.

For instance, in a case where the flexible display unit is bent by an external force, the control unit 180 may be configured to convert a screen image which is displayed on the flexible display unit 151 into another screen image in accordance with a bending direction, a bending angle, and an acceleration to return to its original position of the flexible display unit 151.

As an example, when the flexible display unit 151 is bent inward by an external force, the control unit 180 may display screen images which have been displayed on the flexible display unit 151 to become close to each other. On the contrary, when the flexible display unit 151 is bent outward by an external physical force, the control unit 180 may display screen images which have been displayed on the flexible display unit 151 to be spaced from each other.

Meanwhile, the mobile terminal according to embodiments of the present invention including the flexible display unit 151 may further include a case 200 which covers the flexible display unit 151. The case 200 may be configured to have a space to receive therein hardware such as the control unit 180. Further, the case 200 may be formed as a flexible type so as to be bent, by an external force, together with the flexible display unit 151.

Meanwhile, as described above, the control unit 180 may be configured to create a control signal related to an operation of the mobile terminal according to embodiments of the present invention, in response to bending information of the flexible display unit 151.

Further, the flexible display unit 151 applied to the mobile terminal according to embodiments of the present invention has a foldable and unfoldable structure and its screen can be divided into a plurality of screens (display regions). For instance, the flexible display unit 151 applied to the mobile terminal according to embodiments of the present invention may have a screen to be divided into first through fourth display regions 151a-151d. More than one screen among the first through fourth screens 151a-151d may be folded (or rolled). Also, more than one screen among the first through fourth screens 151a-151d may not be folded (or rolled), but fixed. This will be described with reference to FIGS. 2F through 2I.

Figure 2F:
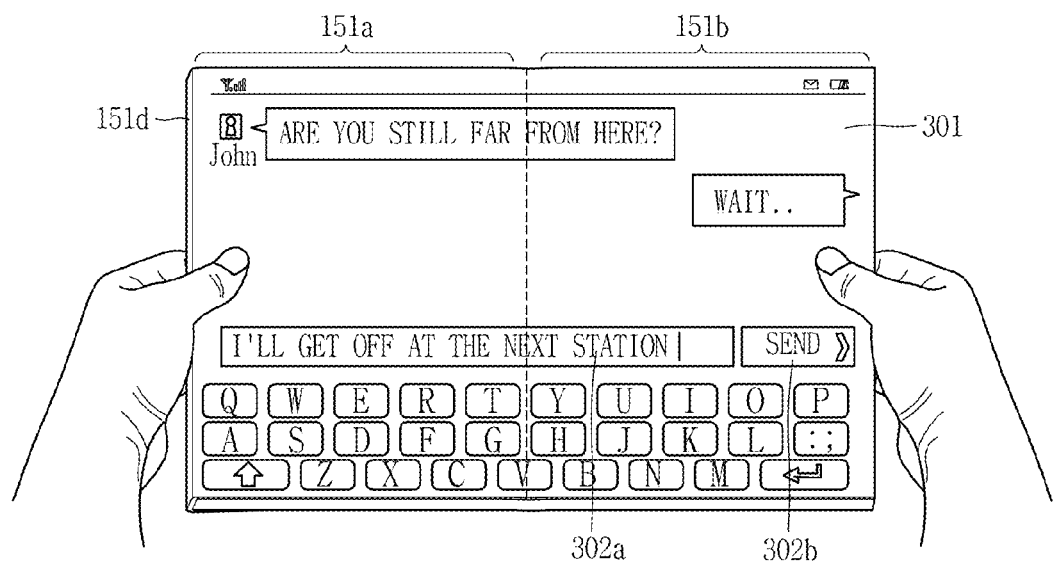
Figure 2F:
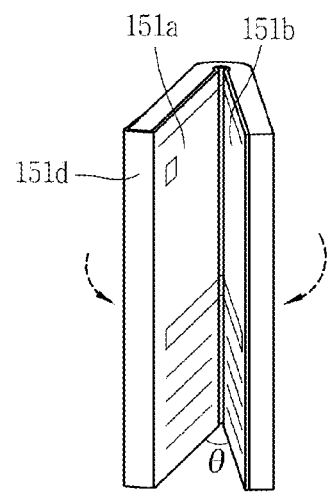
Figure 2F:
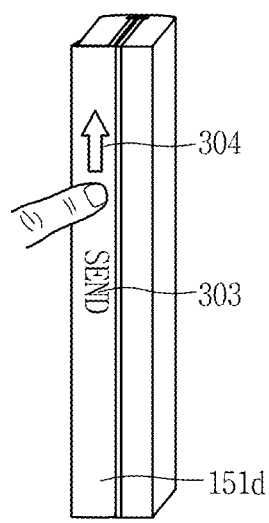
Figure 2F:
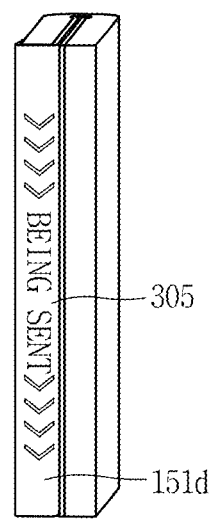

FIGS. 2F[a]-2I are schematic views illustrating the flexible display unit included in the mobile terminal according to the embodiments of the present invention.

Referring to FIG. 2F[a], the display unit 151 includes a first display region 151a disposed at a left front side of a main body and a second display region 151b disposed at a right front side of the main body in a state where the mobile terminal is opened (unfolded state). The first and second display regions 151a and 151b may be formed symmetrically, or one of the first and second display regions 151a and 151b may be formed to have a larger size than the other.

The first display region 151a and the second display region 151b may be folded or unfolded within a predetermined angle (for instance, 0°~210°) or at a specific angle within a range of 0°~360° depending on a hinge structure. Further, since the first display region 151a and the second display region 151b may be exposed only in a state where the mobile terminal is opened, they can be defined as inner surface (or inside surface) display regions. Meanwhile, the first through fourth display regions 151a-151d may be defined as inner surface (or inside surface) display regions in a state where the mobile terminal is in 'an extended open state'.

Here, the term 'an opened state' indicates that inside of the terminal is exposed, namely, a plurality of display regions disposed inside the terminal are partially or entirely unfolded based on a hinge, and exposed to a front surface. For instance, a case where the first display region 151a and the second display region 151b are completely opened without any folding there between and exposed to a front surface, may be referred to as an 'open state'. This state is similar to a state as if a book is opened.

Further, although not shown, a state that the first display region 151a and the second display region 151b are completely opened without any folding there between, and the first display region 151a and the third and fourth display regions 151c and 151d are completely or almost opened without any folding there between, may be referred to as 'an extended open state'.

Meanwhile, the mobile terminal 100 may be converted from the open state as described above into "a bending state", or vice versa. Here, the "bending state" is a state that the first display region 151a or the second display region 151b is further bent in a rear direction from the 'open state', and may occur in case of a structure that a hinge provided between the first display region 151a and the second display region 151b is bent in a rear direction (folded in a rear direction). Such a 'bending state (folded in a rear direction)' may occur in a case where a hinge, provided between the first display region 151a and the second display region 151b, between the first display region 151a and the fourth display region 151d, or between the third display region 151c and the fourth display region 151d, is bent in a rear direction from the extended open state.

In a state where the terminal is opened, an execution screen of at least one application, for example, a dialogue window screen 301 of a message application may be output to a region where the first display region 151a and the second display region 151b are overlapped with each other, as shown in FIG. 2F(a). However, the dialogue window screen 301, which is output to the first display region 151a and the second display region 151b, is a merely example, and a graphic user interface (GUI) of an application, which is currently executed, may be output to at least one of the first display region 151a and the second display region 151b.

Meanwhile, in a case where at least one of the first display region 151a and the second display region 151b is inactive, when a touch is applied to the first display region 151a or the second display region 151b, or in a case where the first display region 151a or the second display region 151b is slightly bent inward or outward and then unfolded, at least one of the first display region 151a and the second display region 151b is converted into an active state, and then an execution screen of at least one application may be output.

Under the state, the sensing unit may sense an occurrence of a folding event at the display unit (or folded state of the display unit). The folding event (or folded state) means that as an external force is applied to a body which encloses the first display region 151a and the second display region 151b, the inner displays, namely, the first display region 151a and the second display region 151b are folded centering around the hinge in a direction to become close to each other.

When a "folding event" that the first display region 151a and the second display region 151b are folded to face each other centering around the hinge under the 'open state', the control unit 180 may recognize a closed type which corresponds to the folding event.

Here, the closed type corresponding to the folding event may be classified to three types, that is, a first closed type to simultaneously fold the first display region 151a and the second display region 151b; a second closed type to fold the first display region 151a so as to cover the second display region 151b, by much moving the first display region 151a while the second display region 151b is scarcely moved; and a third closed type to fold the second display region 151b so as to cover the first display region 151a, by much moving the second display region 151b while the first display region 151a is scarcely moved. An open state of the mobile terminal 200 may be converted into a closed state by one of the first to third closed types.

The display unit 151 according to the embodiments of the present invention is configured to include, in a closed state, a first display region 151a and a second display region 151b disposed on an inner surface of the mobile terminal 100, a third display region 151c disposed on an outer surface of the mobile terminal 100, and a fourth display region 151d extended from one side of the first display region 151a and the second display region 151b, respectively, and disposed on a side surface of the mobile terminal 100.

Thus, it may be referred to that in a case where the 'closed type' corresponds to 1) as described above, the mobile terminal 100 is closed such that the fourth display region 151d is exposed to the front, and in the case of 2), the mobile terminal 100 is closed such that the third display region 151c is exposed to the front. It also may be referred to that, in a case where the closed type is 3, the mobile terminal 100 is closed such that the rear frame or the rear cover may be exposed to the front without exposing the display unit.

For instance, when a 'folding event' that the first display region 151a and the second display region 151b are simultaneously closed, is generated, as shown in FIG. 2F(b), the control unit is configured to display information related to an execution screen (for instance, a dialogue window) output from the first and second display regions 151a and 151b on the fourth display region 151d which is extended from one side of the inner (or inner surface) display region and the outer (or outer surface) display region, respectively, and disposed at a 'side surface' of the display unit.

Here, the information related to the execution screen is changed in accordance with an output state and an output motion of the execution screen being output to the inner surface (or inner side surface) display regions, and a type of the corresponding application, when a 'folding event' is generated. When a 'folding event' is generated in the state shown in FIG. 2F[a], the control unit may recognize a type of an application corresponding to a dialogue window which is output to the first and second display regions 151a and 151b, an operation lastly executed, an operation not completed, and so on.

Meanwhile, the control unit may control the information related to the execution screen to be displayed on the display region exposed to outside only in a case where the 'open state' of the terminal is completely converted into the "closed state" as the 'folding event' occurs.

Here, the "closed state" means that an outer surface of the terminal is exposed, namely, a state that a plurality of the display regions disposed on the inner surface of the terminal are partially or entirely folded centering around the hinge and at least one of outer surface and side surface display regions of the terminal is exposed to the front. When the plurality of display regions disposed at the inner surface of the terminal are entirely folded such that they center around the hinge, the first display region 151a and the second display region 151b are converted into an inactive state.

In such a case, determination of whether a state that the display regions disposed on the inner surface of the terminal is partially folded in a "closed state" or an "open state" may depend on a magnitude of an angle formed amongst the display regions disposed on the inner surface of the terminal in accordance with the folding event.

That is, it is determined as an 'open state' while an angle amongst the display regions disposed on an inner surface is more than a 'reference angle', but it is determined as a "closed state" while the angle becomes less than the 'reference angle'. Thus, in a case where folding or unfolding operations of the display regions disposed on the inner surface is repeated at the vicinity of the reference angle, conversion operations of the "closed state" and the "open state" may be repeatedly executed.

For instance, no information may be displayed on the fourth display region 151d while the angle between the first display region 151a and the second display region 151b is more than the reference angle '$\ominus$,' as shown in FIG. 2F[b]. And the first display region 151a and the second display region 151b may maintain an active state.

Under the state, when an angle between the first display region 151a and the second display region 151b becomes narrower than the reference angle '$\theta$', the terminal is converted into a "closed state" and the first display region 151a and the second display region 151b are converted into an inactive state. This state may be similar to a case that a book is closed at both sides so that a width of a side surface of the pages can be seen from the front side.

And then, the information, related to the execution screen output to the first display region 151a and the second display region 151b, is displayed on the fourth display region 151d, as shown in FIG. 2F[c]. Here, the information output to the fourth display region 151d, in a state where the terminal is closed, is indicative of different information from the information output to the first display region 151a and the second display region 151b, in a state where the terminal is opened. To this end, the first display region 151a, the second display region 151b, and the fourth display region 151d may be demarcated by a different type of user graphic interface (GUI).

Specifically, in a state where a message 302a, which is drafted in a dialogue window screen 301 shown in FIG. 2F[a], is not transmitted (302b), when a 'folding event' to simultaneously fold the first display region 151a and the second display region 151b centering around the hinge occurs, an icon 304 and guide information 303 for transmitting the drafted message 302a may be output to the fourth display region 151d.

The icon may inform an input method of a control command, namely, a drag direction of a touch input as an arrow (for instance, upwardly drag touch input). And the guide information 303 may include "send" indicative of a message transmission. When a flicking touch input is applied to a region where the guide information 303 is displayed, the drafted message may be displayed as a preview type.

The icon 304 and the guide information 303 may be displayed on the basis of a spot where a user's touch input is applied. For instance, when a 'folding event' occurs in a state where a user grasps (touches) a left lower end of the first display region 151a and a right lower end of the second display region 151b so as to be symmetrical to each other, the icon 304 and the guide information 303 may be displayed at a position close to a touch-applied position, not at the touch-applied position.

Further, the icon 304 and the guide information 303 may be displayed as an image which is formed long as a bar type along a side surface of the fourth display region 151d. Also, the icon 304 and the guide information 303 may be formed as a moving image in accordance with an amount of information to be displayed.

Further, the display unit 151 according to embodiments of the present invention may include a touch sensor which is configured to sense a touch input so that the touch input can be applied to the icon 304. Further, the display unit 151 may be configured to output visual information which is implemented in the form of image, text, and icon like the GUI, and then to be converted into an inactive state when a predetermined time has elapsed or a specific control command is input Further, when the icon 304 and the guide information 303 are output, a corresponding voice guide may be output through the sound output unit 252. For instance, a voice guide such as "Push a transmission button up (or down) if you want to transmit a message" may be output together.

Under such a state, when a drag input (for instance, an upward drag input) is applied to the icon 304 in a direction indicated by the icon 304 displayed on the fourth display region 151d, a message 302a drafted in a state where the terminal is open is transmitted to the other party's terminal. That is, an operation which has not yet completed in the 'open state' may be consecutively executed in the "closed state". And an image 305 informing that a message is being transmitted may be displayed on the fourth display region 151d while the message is transmitted, as shown in FIG. 2F[d]. Further, while a message is transmitted, the fourth display region 151d may be temporarily converted into an inactive state (or an input of a control command applied to the fourth display region 151d is restricted).

When a message transmission is completed, an image informing the completion of transmission may be displayed on the fourth display region 151d for a preset time. Then the fourth display region 151d may be converted into an active state to sense a subsequent input or prepare for a subsequent motion (for instance, 'open event' which will be described in detail).

Further, although not shown, when a message transmission is completed, other information related to the execution screen which is output to the first display region 151a and the second display region 151b, may be displayed on the fourth display region 151d. For instance, icons of applications which have been most recently executed on the first display region 151a and the second display region 151b, or icons of applications which are being currently executed on the first display region 151a and the second display region 151b may be displayed in a preset order.

According to the driving method as above, in a case where a user folds the terminal without completing an operation executed on the inner surface (inner side surface) display in an open state of the terminal, it is possible to continue the remaining operation using the outer surface display without re-opening the terminal, thereby implementing a simple and convenient user interface.

Further, while the terminal is in a 'closed state', since information related to an operation that has been lastly executed on the inner surface (inner side surface) display region, or an application being executed is provided, it is possible to inform a user of the information as a new type.

Figure 2G:
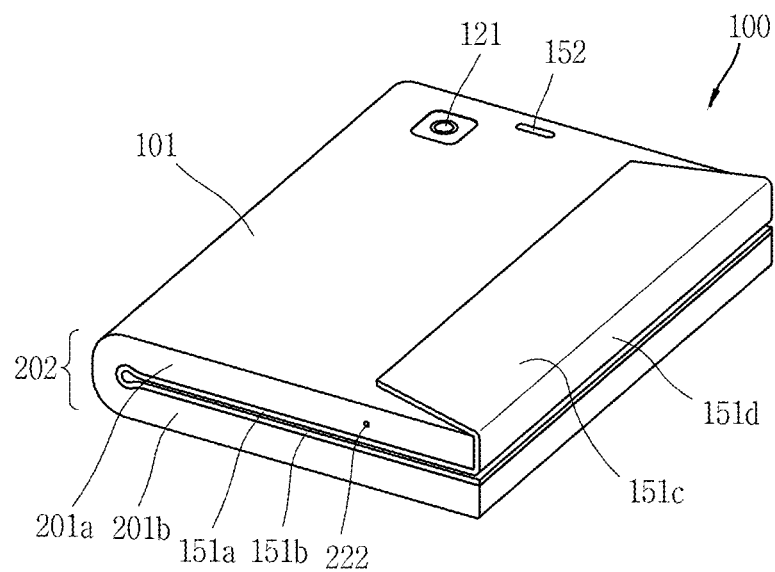
Figure 2H:
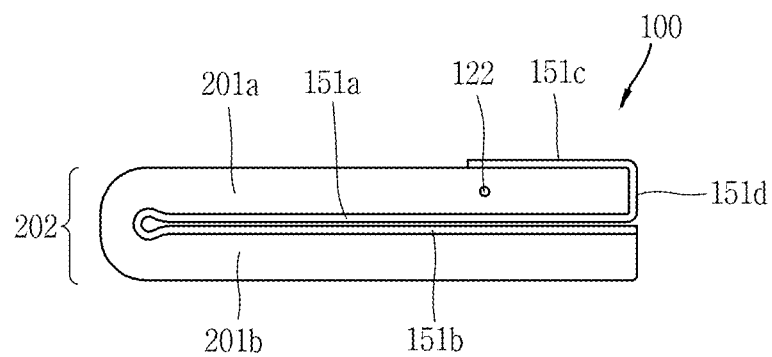
Figure 21:
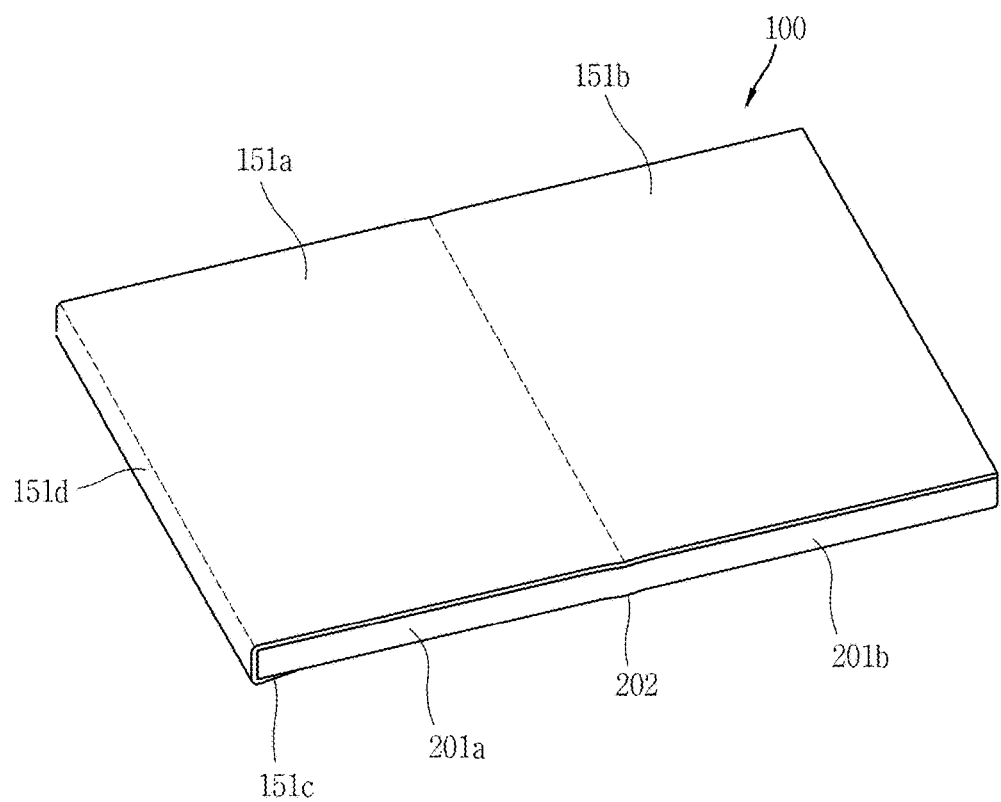

Hereinafter, a hardware structure of the mobile terminal which executes the operation as above will be described in more detail with reference to FIGS. 2G, 2H, and 2I. FIGS. 2G and 2H are views illustrating the mobile terminal according to the embodiments of the present invention in a 'closed state' viewed from different directions, and FIG. 2I is a view illustrating the mobile terminal according to embodiments of the present invention in an 'open state' viewed from the front side.

The mobile terminal 100 shown in FIGS. 2G and 2H includes a folder type terminal body in a 'closed state', but the embodiments of the present invention are not limited to such type.

The folder type terminal body according to embodiments of the present invention may include a first body 201a, and a second body 201b which is configured to fold on or unfold from at least one side of the first body 201a. As shown in FIGS. 2G and 2H, a state that the first body 201a and the second body 201b are disposed to be overlapped with each other, namely, a state that the first and second bodies 201a and 201b are folded on each other based on the hinge 202 may be referred to as a closed state (closed configuration) as mentioned above. Under the closed state, the first body 201a and the second body 201b are disposed to face each other.

Under the 'closed state', the third display region 151c disposed on an outer front surface and the fourth display region 151d disposed on a side surface by being extended from the third display region 151c are prepared. One side of the fourth display region 151d disposed on a side surface is extended to one side of the first and second display regions 151a and 151b which are covered by the first body 201a and the second body 201b.

That is, under the 'closed state', although the third display region 151c disposed on an outer front surface and the fourth display region 151d extendedly disposed on a side surface are exposed and the first and the second display regions 151a and 151b disposed on an inner surface are covered, the plurality of display regions which are foldable or unfoldable as above described in the present invention may be substantially connected to each other to form a single display. In another embodiment, a plurality of displays are connected to each other so that a foldable or unfoldable display 151 may be formed in the present invention.

One side (e.g., an edge region) of the third display region 151c disposed on an outer front surface, and one side (for instance, an edge region) of the fourth display region 151d disposed on a side surface may be covered by a case or a cover.

Meanwhile, although not shown, the fourth display region 151d may be configured to have a predetermined curvature. Under such a configuration, the third display region 151c disposed on an outer front surface and the fourth display region 151d disposed on a side surface are connected to each other in a rounded shape to form a display. Thus, in a case where the third display region 151c disposed on an outer front surface is exposed to the front side, at least part (here, it means to include an entire region) of the second display region 151b may also be exposed to the front side.

The hinge 202 is configured to support the first display region 151a and the second display region 151b which are disposed on an inner surface based on a corresponding region to be partially or entirely folded. In a 'closed state', the first and second display regions 151a and 151b which are folded by the hinge 202 are provided on the first and second bodies 201a and 201b, respectively, and the first and second display regions 151a and 151b may be folded by a predetermined angle, for instance, 0°~180° or at a specific angle within a range of 0°~360° depending on a structure of the hinge 202.

The first and second bodies 201a and 201b may include a case 201 (casing, housing, cover, and the like) which forms an external appearance. In this embodiment, the case 201 may be divided into a front case and a rear case. Here, within a space formed between the front case and the rear case, various electronic components may be mounted. At least one intermediate case may be additionally disposed between the front case and the rear case.

Further, the case 201 may be fabricated by injection-molding synthetic resins, or may be formed to have a metal such as stainless steel or titanium.

At one side of the first body 201a forming an external appearance of the first body 201a, namely, at one side of the front case, the fourth display region 151d extended from the inner side, a sound output unit 152, a camera module 121, and the like may be disposed. At one side surface (for instance, a left side surface) extended from the front case, the hinge 202 is disposed, and at the other side surface (for instance, a right surface), the fourth display region 151d extending to the inner display regions may be disposed. Hereinafter, the fourth display region 151d may be referred to as an "outer extension display (region)".

The fourth display region 151d is configured to display visual information related to information which is processed by the first and second display regions 151a and 151b. For example, execution screen information of an application program which is driven by the mobile terminal 100, or user interface (UI) and graphic user interface (GUI) information in accordance with the execution screen information, and various user interface (UI) and graphic interface (GUI) information related to an execution screen which is processed by the first and second display regions 151a and 151b may be displayed.

By such features of the flexible material, a terminal main body, which has a display unit foldable or bendable partially or wholly, may be implemented.

Further, the display unit may include a touch sensor that senses a control command by a touch method. When a touch is applied to the fourth display region 151d, the touch sensor may sense the touch and the control unit may generate a control command corresponding to the touch input. Content which is input in a touching manner may be a text or numerical value, or a menu item which can be indicated or designated in various modes.

Meanwhile, the touch sensor is configured in the form of a film having a touch pattern and disposed between a window and a display on a rear surface of the window, or may be a metal wire directly patterned on the rear surface of the window. Or, the touch sensor may be formed integrally with the display. For instance, the touch sensor may be disposed on a substrate of the display, or within the display.

As described above, the display unit may form a touch screen together with the touch sensor, and in this case the touch screen may function as a user's input unit 123 (refer to FIG. 1). Further, such features of the display unit may be equally applied to the first and second display regions 151a and 151b which are disposed on an inner surface so as to be connected to the fourth display region 151d.

That is, the display unit 151 is disposed at part of a front surface and a side surface of the terminal in a 'closed state' and configured to display visual information. Further, the display unit according to the present invention is configured such that it is extended not only to the front and side surfaces, but to the inner surface of the terminal. Specifically, the display unit is provided with the first and second display regions 151a and 151b disposed on a front surface of the terminal in an 'open state', and the third display region 151c extended from the first display region 151a and disposed on part of the front surface of the terminal and the fourth display region 151d disposed on a side surface of the terminal in a 'closed state'.

The camera module 121 may be disposed on part of an entire region where the third display region 151c is disposed. The camera module 121 is configured to process a picture frame of a still image or a moving image obtained by an image sensor in a capturing mode or a video call mode. The processed picture frame may be displayed on the display unit 151, especially on the third display region 151c and stored in the memory 170.

Further, although not shown, a rear side input unit may be provided at a rear portion of the mobile terminal 100 as another example of the user's input unit 123.

Such a rear side input unit is manipulated to receive a command to control an operation of the mobile terminal 100, and the input content may be differently set. For instance, the rear side input unit may receive commands such as POWER ON/OFF, START, END, SCROLL, a control of a level of sound output from the sound output unit 152, a conversion into a touch recognition mode of the display unit, and the like. The rear input unit may also be configured to receive a touch input, a push input, and a combination thereof.

The mobile terminal 100 shown in FIG. 2I includes a folder type terminal body in an 'open state'.

The 'open state' of the mobile terminal 100 is a state that, as shown in FIG. 2I, the first body 201a and the second body 201b are rotated in a direction to become distant, and the first display region 151a and the second display region 151b are exposed to the front side, that is, a state that the first and second bodies 201a and 201b are unfolded centering around the hinge 202, may be referred to as an "open state (open configuration)".

Under such a state, the first display region 151a and the second display region 151b which are in contact with each other are exposed. For instance, the first display region 151a is disposed at a left region of the mobile terminal 100 and the second display region 151b is disposed at a right region of the mobile terminal 100. At the left of the first display region 151a, the second display region 151b is disposed in an extending manner. Here, the third display region 151c which is in contact with and adjacent to the fourth display region 151d is covered to be in contact with a floor as the first display region 151a is exposed to an upper side. Meanwhile, the covered third display region 151c may be unfolded from the outer side to the inner side together with the fourth display region 151d while maintaining the 'open state' of the mobile terminal 100. As a result, it is possible to convert into an 'extended open state', as described above.

Under such a state, since the third display region 151c and the fourth display region 151d are connected to each other, together with the first and second display regions 151a and 151b, it is possible to utilize the display unit as a larger sized screen.

Meanwhile, either part of the first display region 151a under the 'open state', or the third and fourth display regions 151c and 151d under the 'extended open state' may be operated independently from the first and second display regions 151a and 151b. Especially, the third and fourth display regions 151c and 151d under the 'extended open state' may be configured to output different screen information from an execution screen output to the first and second display regions 151a and 151b, or may be implemented to receive a specific command to control an output of an execution screen output to the first and second display regions 151a and 151b.

In another embodiment, screen information output to the first and second display regions 151a and 151b is extended up to the third display region 151c so that the display unit can be utilized as a larger sized screen by extending the currently executed screen by a user.

Further, in the mobile terminal 100 as shown in the drawings, accessories may be added to protect an external appearance and to supplement and extend the function of the mobile terminal 100. As an example of such accessories, a cover or a pouch, which may cover at least one side of the mobile terminal 100 or accommodate therein, may be included. The cover and pouch may be configured to extend the function of the mobile terminal 100 by being connected with the display unit 151. As another example of the accessories, a touch pen may be included to supplement or extend a touch input of the touch screen. The touch pen may be coupled to the mobile terminal 100 in an insertion type into the hinge provided between the first display region 151a and the second display region 151b.

Hereinafter, will be described a mobile terminal and a control method which includes: sensing a folded position (a folding state) of a flexible display unit 151, dividing a screen of the flexible display unit based on the sensed folded position, rearranging contents (for instance, applications, internet pages, photos, messages, videos, and the like) in accordance with the divided screens, and displaying the rearranged contents on the divided screens.

Figure 3:
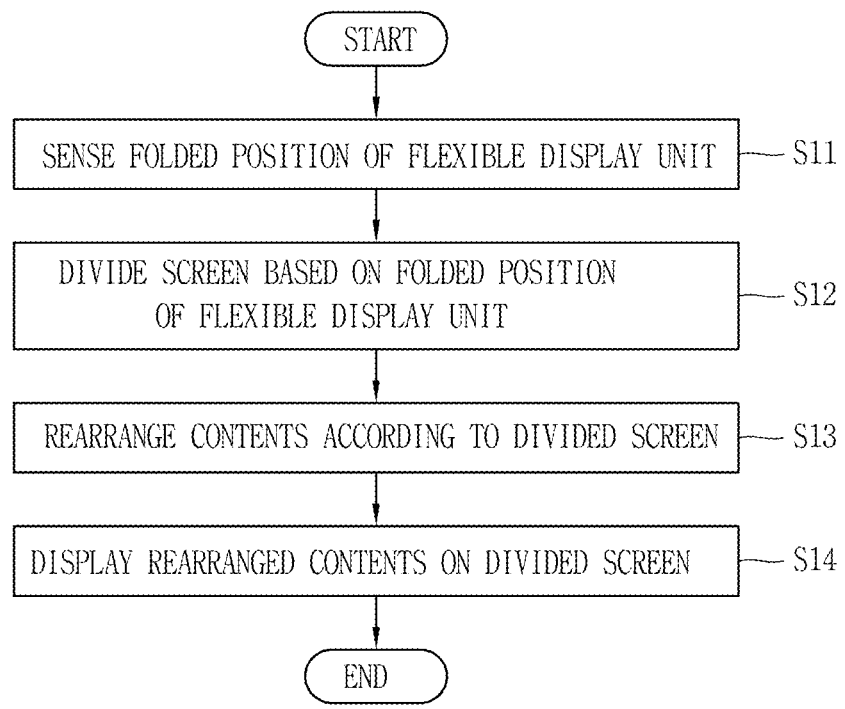
FIG. 3 is a flowchart illustrating a control method according to an embodiment of the present invention.

FIG. 3 is a flow chart illustrating a control method according to an embodiment of the present invention.

First, a bend sensor 145 senses a folded position of the flexible display unit 151, and outputs the sensed folded position to the control unit 180 (S11). For instance, the bend sensor 145 generates a first sensing signal indicating a folded state of the first display region 151a when the first display region 151a of the flexible display unit 151 is folded, and outputs the generated first sensing signal to the control unit 180. The bend sensor 145 generates a second sensing signal indicating a folded state of the second display region 151b when the second display region 151b of the flexible display unit 151 is folded, and outputs the generated second sensing signal to the control unit 180. The bend sensor 145 generates a third sensing signal indicating a folded state of the third display region 151c when the third display region 151c of the flexible display unit 151 is folded, and outputs the generated third sensing signal to the control unit 180.

The control unit 180 is configured to divide a screen (display region) of the flexible display unit based on the folded position of the flexible display unit 151 (S12).

The control unit 180 rearranges the contents (for instance, applications, internet pages, photos, messages, videos, and the like) displayed on the entire screen of the flexible display unit 151 in accordance with the divided screens (S13), and displays the rearranged contents on the divided screens (S14). For example, the control unit 180 displays internet pages on the folded first display region 151a when the first display region 151a is folded in a state where the internet pages have been displayed on the entire screen (for instance, the first through third display regions 151a-151c) of the flexible display unit 151, or displays the internet pages on the second and third display regions 151b and 151c.

FIGS. 4A through 4E are exemplary views illustrating a method to display contents on the divided flexible display unit according to embodiments of the present invention.

Figure 4A:
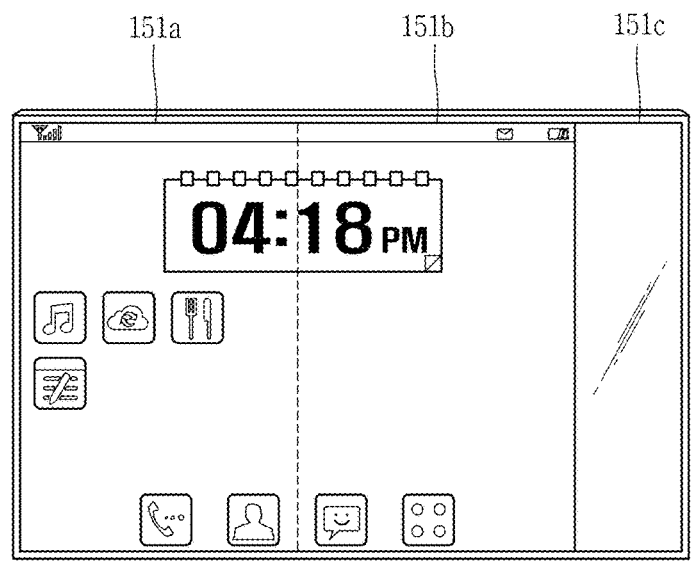
FIGS. 4A through 17B are exemplary views illustrating a method to display contents on a divided flexible display unit according to an embodiment of the present invention.
Figure 4B:
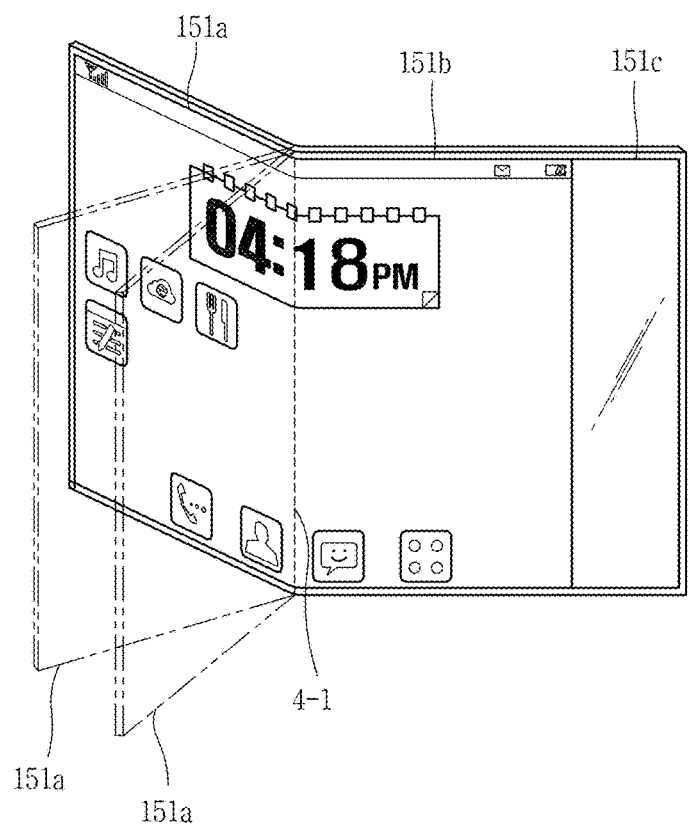
Figure 4C:
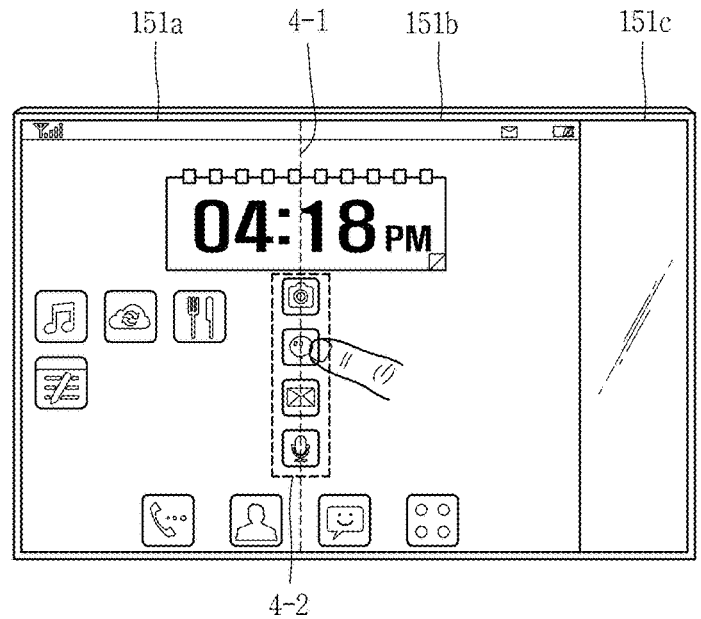

As shown in FIGS. 4A through 4C, the control unit 180 may be configured to display applications 4-2 (for instance, a camera application, a calendar application, a navigation application, and the like) along a folding line 4-1 of the first display region 151a when the first and second display regions 151a and 151b are folded inward or outward in a state where screen information (for instance, home screen) is displayed on the entire screen (for instance, the first through third display regions 151a-151c) or the first and second display regions 151a and 151b of the flexible display unit 151. The control unit 180 is configured to continuously maintain the displayed state of the applications 4-2 although the first and second display regions 151a and 151b are restored to a flat state after being folded inward or outward.

The control unit 180 may be configured to display applications 4-2 on the entire screen or the first and second display regions 151a and 151b when the first and second display regions 151a and 151b are folded inward or outward in a state where screen information (for instance, home screen or locked screen) is displayed on the entire screen (for instance, the first through third display regions 151a-151c) or the first and second display regions 151a and 151b of the flexible display unit 151.

Figure 4D:
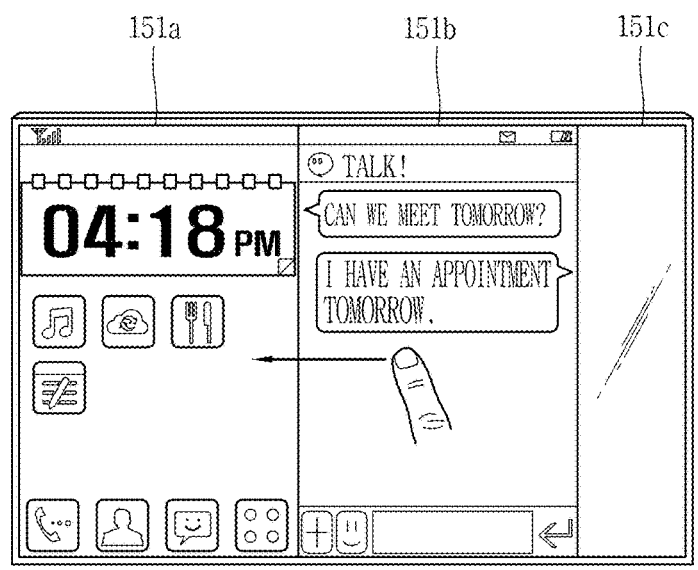
Figure 4E:
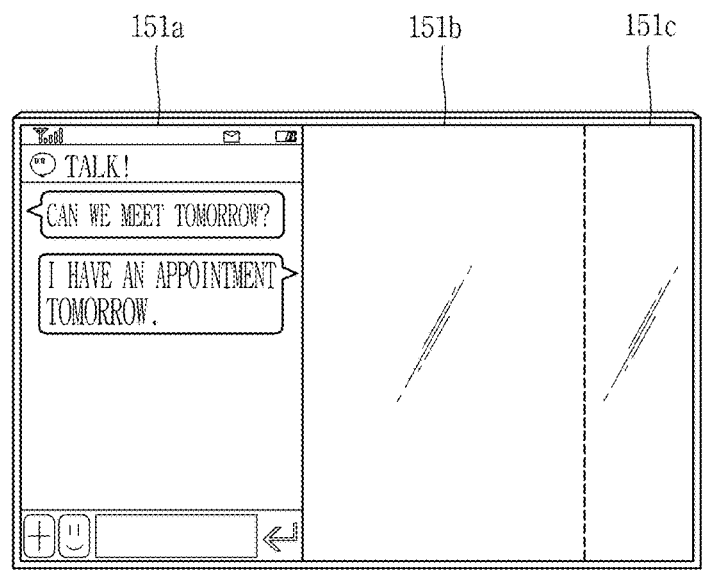

As shown in FIGS. 4D and 4E, the control unit 180 is configured to execute a selected application when a specific application is selected by a user among the applications which are displayed along the folding line 4-1 of the first display region 151a, and display an execution screen 4-3 of the application on the first or second display region 151a or 151b. The control unit 180 is configured to display the execution screen of the application on the entire screen (for instance, the first through third display regions 151a-151c) upon receipt of a preset touch input (for instance, drag, swipe, and the like) for displaying the execution screen of the application on the entire screen.

The control unit 180 is configured to display an execution screen of a specific application on the first display region 151a when the specific application is moved to the first display region 151a by a users touch input (for instance, drag and drop) among the applications 4-2 displayed along the folding line 4-1 of the first and second display regions 151a and 151b.

The control unit 180 may be configured to display an execution screen of a specific application on the second display region 151b when the specific application is moved to the second display region 151b by a user's touch input (for instance, drag and drop) among the applications 4-2 displayed along the folding line 4-1 of the first and second display regions 151a and 151b.

Figure 5A:
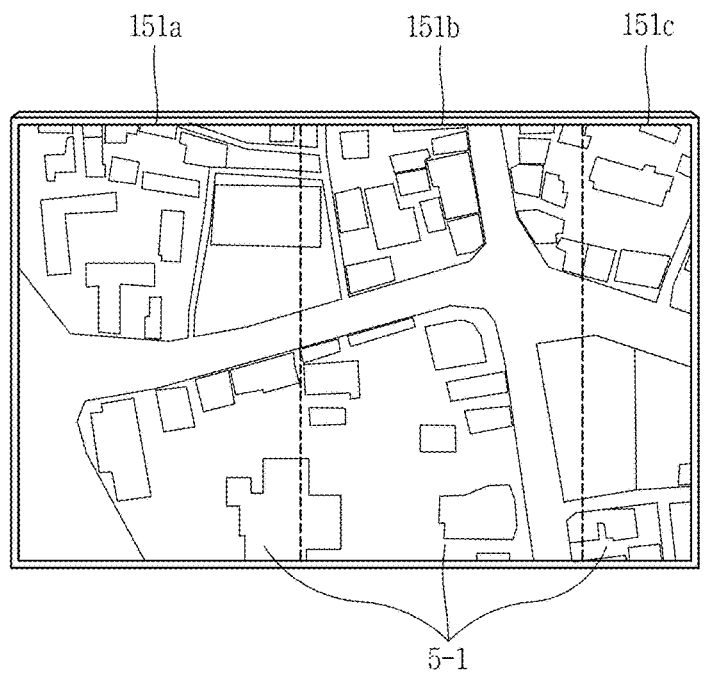
Figure 5B:
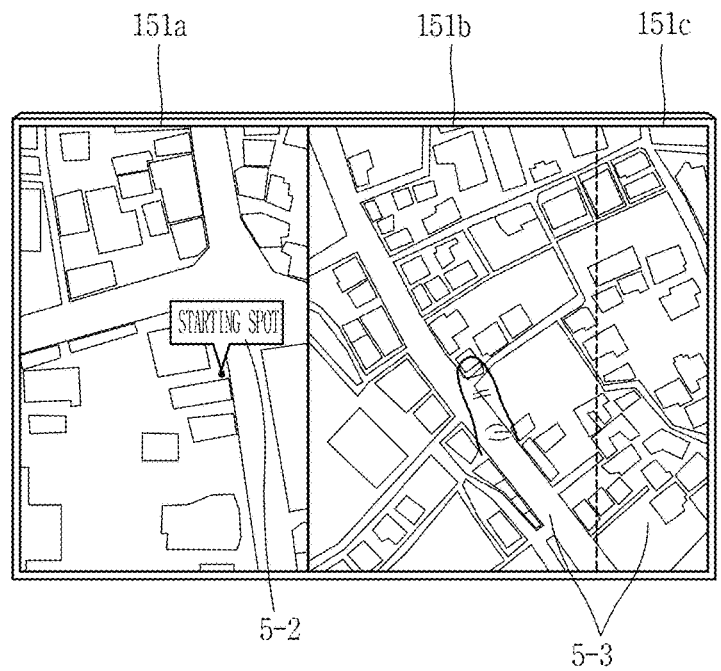
Figure 5C:
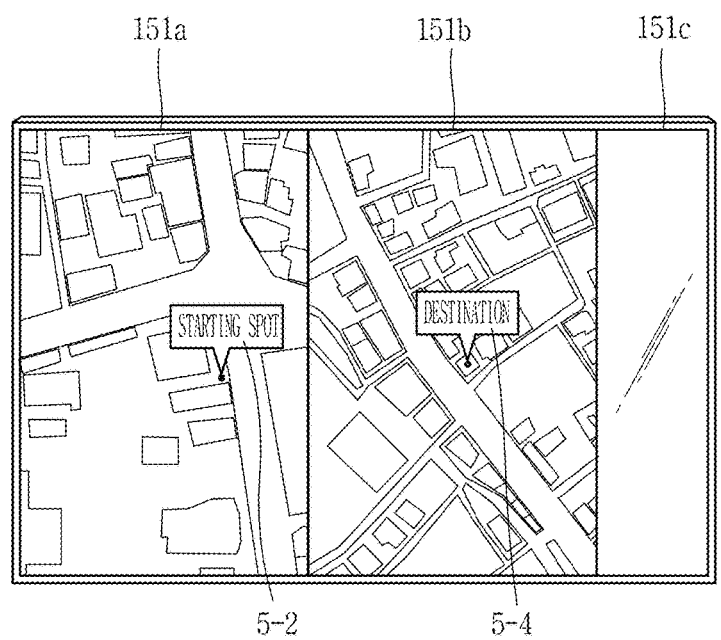

FIGS. 5A through 5C are exemplary views illustrating another method to display contents on the divided flexible display unit according to embodiments of the present invention.

As shown in FIGS. 5A and 5B, the control unit 180 is configured to display a start spot 5-2 on the first display region 151a when the first and second display regions 151a and 151b are folded inward or outward in a state where map data 5-1 is displayed on the entire screen (for instance, the first through third display regions 151a-151c) of the flexible display unit 151, and display map data 5-3 for searching a destination (a place of arrival) on the second and/or third display region 151b and/or 151c.

As shown in FIG. 5C, when a destination is selected by a user on the map data displayed on the second and/or third display region 151*b* and/or 151*c*, the control unit 180 displays the selected destination 5-4 on the second and/or third display region 151*b* and/or 151*c*. That is, the control unit 180 is configured to, when the flexible display unit 151 is folded in a state where map data is displayed on the entire screen, divide the flexible display unit 151 into a plurality of screens (for instance, the first through third screens 151*a*-151*c*) based on the folded position, display a start spot 5-2 on a first screen (the first display region 151*a*) among the plurality of the divided screens, and display a destination 5-4 on a second screen (the second and/or third display region).

The control unit 180 may be configured to, when the flexible display unit 151 is folded in a state where map data is displayed on the entire screen, divide the flexible display unit 151 into a plurality of screens (for instance, the first through third screens 151*a*-151*c*) based on the folded position, display a start spot 5-2 on a second screen (the second display region 151*b*) among the plurality of the divided screens, and display a destination 5-4 on a first screen (the first display region).

Figure 6A:
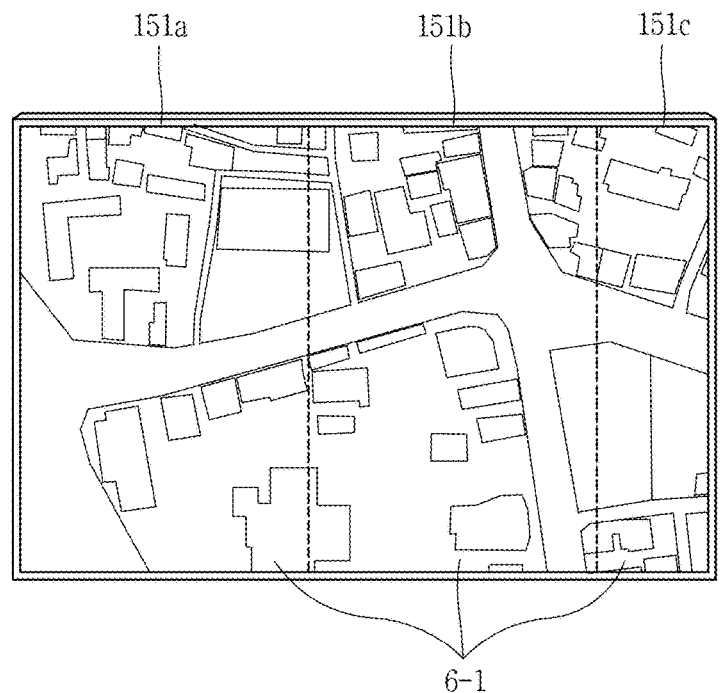
Figure 6B:
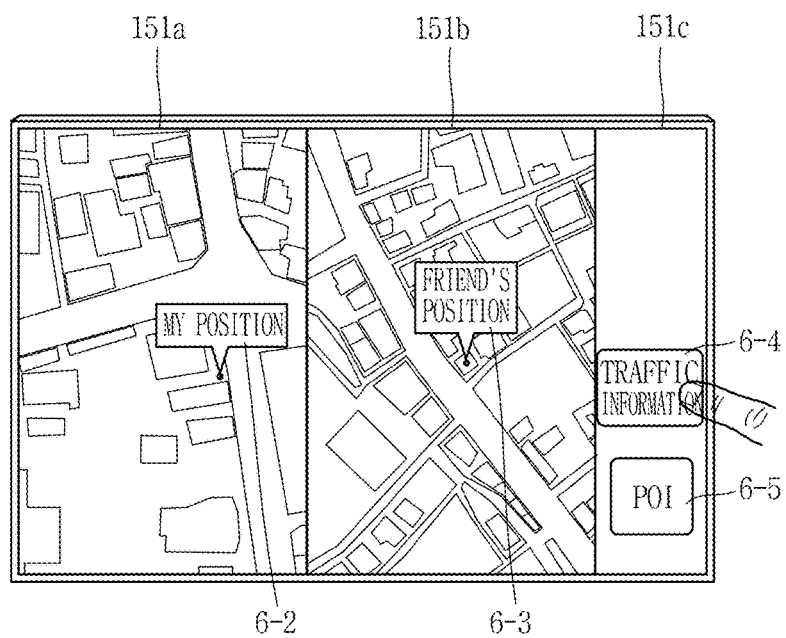
Figure 6C:
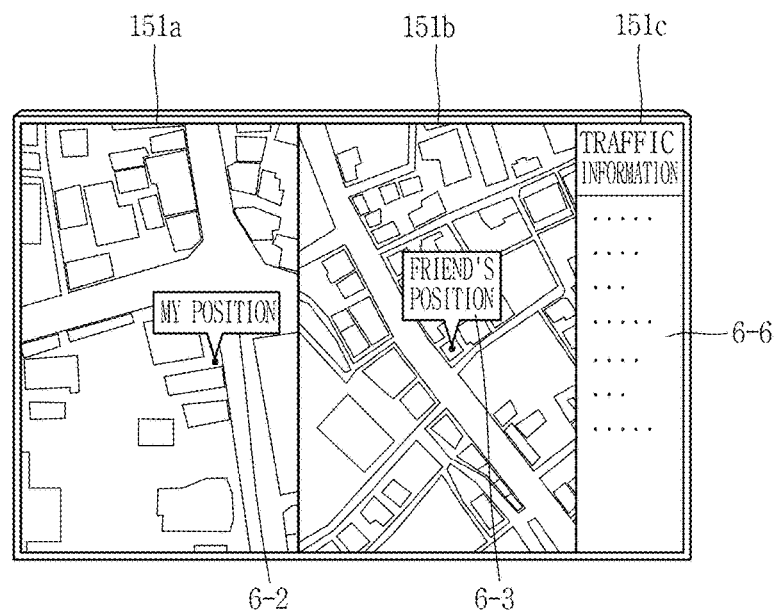

FIGS. 6A through 6C are exemplary views illustrating a method to display contents on a divided flexible display unit according to still another embodiment of the present invention.

As shown in FIGS. 6A and 6B, the control unit 180 is configured to display map data 6-1 on the entire screen (for instance, the first through third display regions 151*a*-151*c*) of the flexible display unit 151, automatically display a current position 6-2 of the mobile terminal 100 on the first display region 151*a* when the first and second display regions 151*a* and 151*b* are folded inward or outward in a state where a current position (for instance, my position) of the mobile terminal 100 and a position of the other mobile terminal (for instance, a friend's mobile terminal) have been sensed, and automatically display a position 6-3 of the other mobile terminal (for instance, a friend's position) on the second and/or third display regions 151*b* and/or 151*c*.

The control unit 180 may be configured to display an icon 6-4 for providing traffic information, and an icon 6-5 for providing a point of interest (POI) such as gourmet restaurants, gas stations, restaurants, and the like on the third display region 151*c* when a position of the other mobile terminal (for instance, a friend's position) 6-3 is displayed only on the second display region 151*b*.

As shown in FIG. 6C, when an icon 6-4 for providing traffic information displayed on the third display region 151*c* is selected by a user, the control unit 180 receives real time traffic information 6-6 related to a route from the current position to the friend's position through a wireless communication unit 110, and displays the received real time traffic information 6-6 on the third display region 151*c*. When an icon 6-4 for providing traffic information displayed on the third display region 151*c* is selected by a user, the control unit 180 may search a means of transportation to move from the current position to the friend's position, and display the searched means of transportation on the third display region 151*c*.

The control unit 180 is configured to control the POI icon 6-5 displayed on the third display region 151*c* to display a position of interest related to a route from the current position to the friend's position on the third display region 151*c*.

Figure 7A:
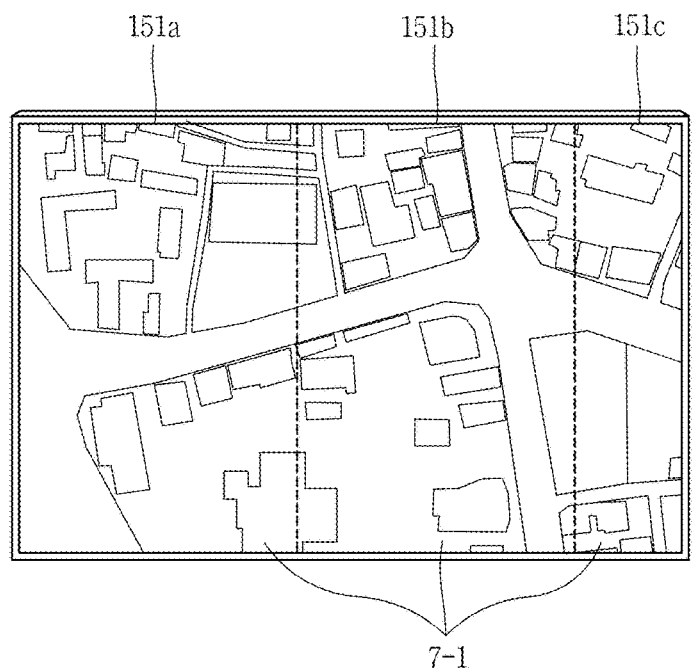
Figure 7B:
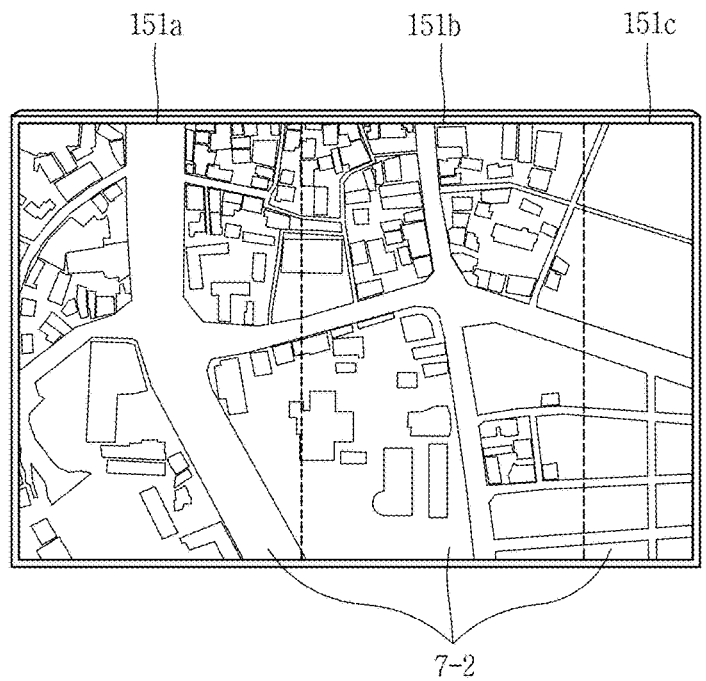
Figure 7C:
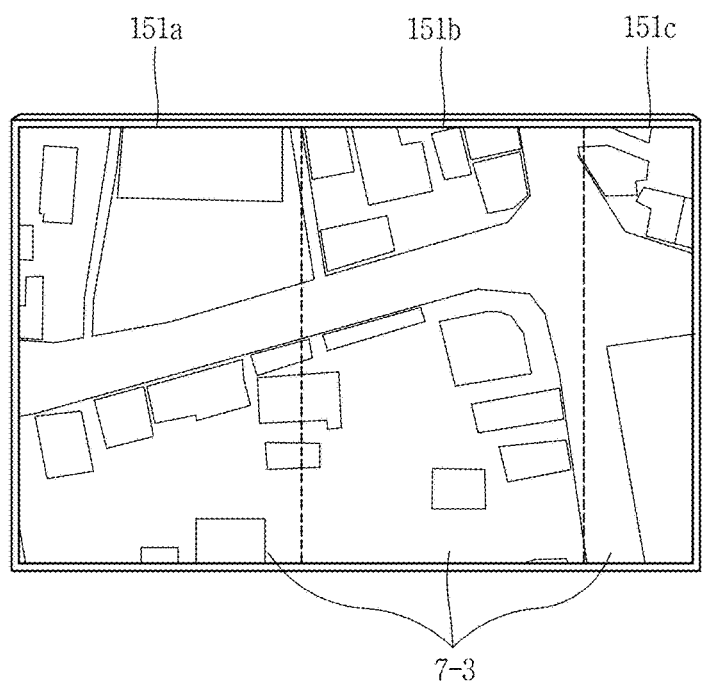

FIGS. 7A through 7C are exemplary views illustrating still another method to display contents on a divided flexible display unit according to embodiments of the present invention.

As shown in FIGS. 7A through 7C, when at least one of the first through third display regions 151*a*-151*c* is folded in a state where map data 7-1 is displayed on the entire screen (for instance, the first through third display regions 151*a*-151*c*) of the flexible display unit 151, the control unit 180 may be configured to enlarge or contract the map data 7-1. For instance, the control unit 180 is configured to contract the map data 7-1 when the first and second display regions 151*a* and 151*b* are folded inward, and display the contracted map 7-2 on the entire screen (for instance, the first through third display regions 151*a*-151*c*). When the first and second display regions 151*a* and 151*b* are folded outward, the control unit 180 is configured to enlarge the map data 7-1, and display the enlarged map 7-3 on the entire screen (for instance, the first through third display regions 151*a*-151*c*).

The control unit 180 may be configured to count the number of times that the first and second display regions 151*a* and 151*b* are folded inward, and gradually contract the map data 7-1 whenever the number of times is increased. The control unit 180 may be configured to count the number of times that the first and second display regions 151*a* and 151*b* are folded outward, and gradually enlarge the map data 7-1 whenever the number of times is increased.

Figure 8A:
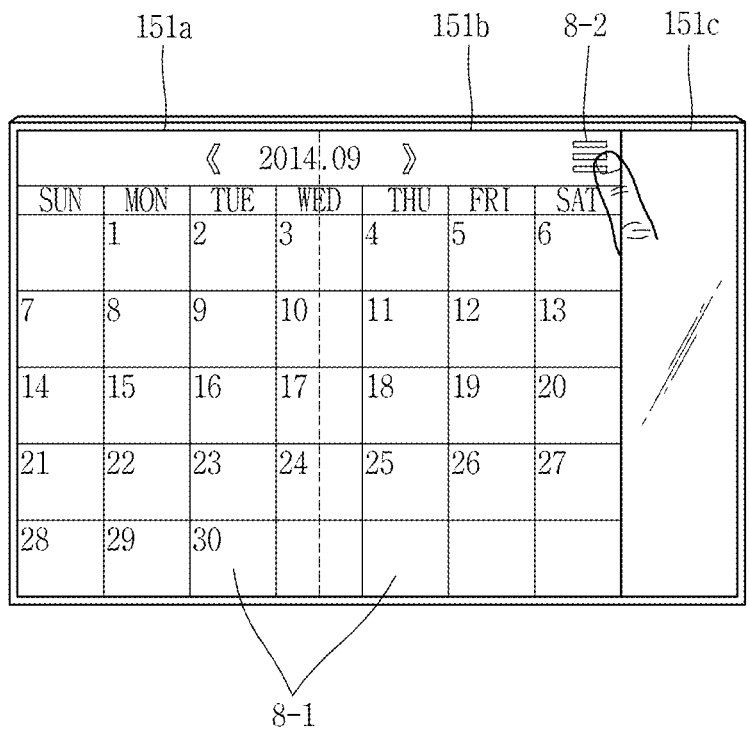
Figure 8B:
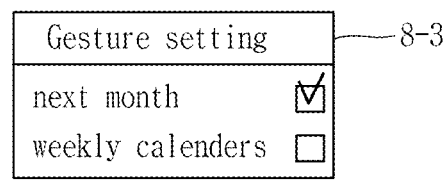
Figure 8C:
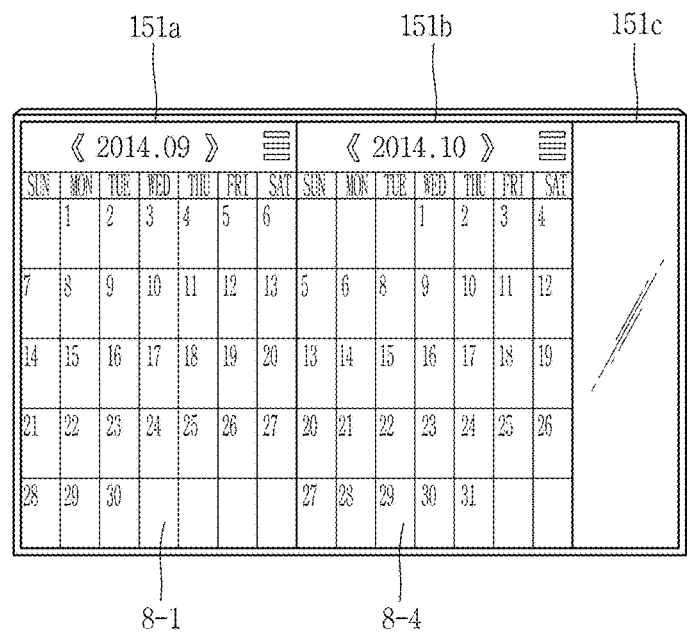

FIGS. 8A through 8C are exemplary views illustrating still another method to display contents on a divided flexible display unit according to embodiments of the present invention.

As shown in FIGS. 8A and 8B, the control unit 180 is configured to display a calendar 8-1 (for instance, a calendar of this month) on the first and second display regions 151*a* and 151*b* (or, the entire screen) of the flexible display unit 151 according to a users request, and display a menu 8-3 for setting a gesture on the first and second display regions 151*a* and 151*b* (or, the entire screen) when a gesture setting icon 8-2 displayed on the calendar 8-1 is selected by a user.

The menu 8-3 includes a first item for displaying a calendar of this month on the first display region 151*a* and a calendar of next month on the second display region 151*b* when the first and second display regions 151*a* and 151*b* are folded inward; and a second item for displaying a calendar of this month on the first display region 151*a* and a calendar of this week on the second display region 151*b* when the first and second display regions 151*a* and 151*b* are folded outward.

As shown in FIG. 8C, the control unit 180 is configured to display a calendar of this month 8-1 on the first display region 151*a* and a calendar of next month 8-4 on the second display region 151*b* when the first and second display regions 151*a* and 151*b* are folded inward in a state where a calendar (for instance, a calendar of this month) 8-1 is displayed on the first and second display regions 151*a* and 151*b* of the flexible display unit 151.

The control unit 180 may return to its original state (for instance, a calendar of this month on the first and second display regions) when the first and second display regions 151*a* and 151*b* are re-folded inward in a state where a calendar of this month 8-1 is displayed on the first display region 151*a* and a calendar of next month 8-4 is displayed on the second display region 151*b*.

The control unit 180 may return to its original state (for instance, a calendar of this month on the first and second display regions) when the first and second display regions 151*a* and 151*b* are unfolded in a state where a calendar of this month 8-1 is displayed on the first display region 151*a* and a calendar of next month 8-4 is displayed on the second display region 151*b*.

The control unit 180 may return to its original state (for instance, a calendar of this month on the first and second display regions) when a gesture to pull the first and second display regions 151a and 151b is sensed in a state where a calendar of this month 8-1 is displayed on the first display region 151a and a calendar of next month 8-4 is displayed on the second display region 151b. The gesture to pull the first and second display regions 151a and 151b may be sensed by a tensile sensor disposed in the flexible display unit 151. The tensile sensor is configured to sense whether the first and second display regions 151a and 151b have been pulled by an external force. The first and second display regions 151a and 151b may be extended by an external force and restored to its original state by elasticity.

Figure 8D:
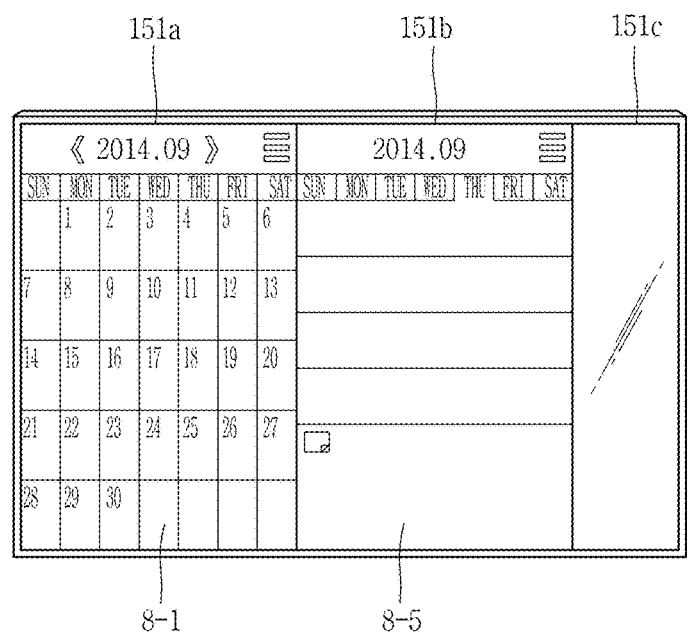

As shown in FIG. 8D, the control unit 180 is configured to display a calendar of this month 8-1 on the first display region 151a and a calendar of this week on the second display region 151b when the first and second display regions 151a and 151b are folded outward in a state where a calendar (for instance, a calendar of this month) 8-1 is displayed on the first and second display regions 151a and 151b of the flexible display unit 151.

The control unit 180 may return to its original state (for instance, a calendar of this month on the first and second display regions) when the first and second display regions 151a and 151b are re-folded outward in a state where a calendar of this month 8-1 is displayed on the first display region 151a and a calendar of this week is displayed on the second display region 151b.

The control unit 180 may return to its original state (for instance, a calendar of this month on the first and second display regions) when a gesture to pull the first and second display regions 151a and 151b is sensed in a state where a calendar of this month 8-1 is displayed on the first display region 151a and a calendar of this week is displayed on the second display region 151b.

Figure 9A:
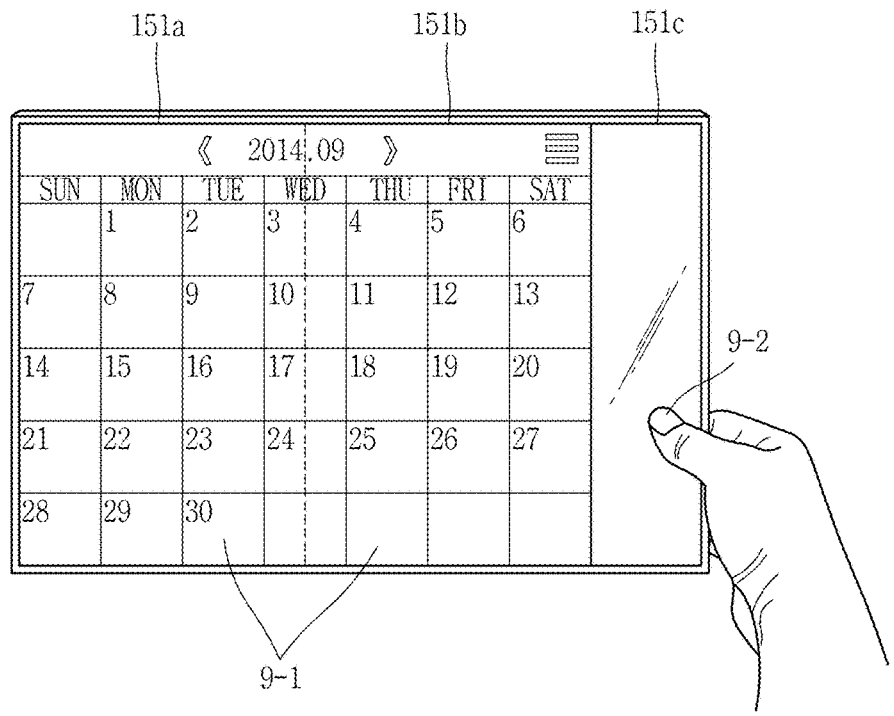
Figure 9B:
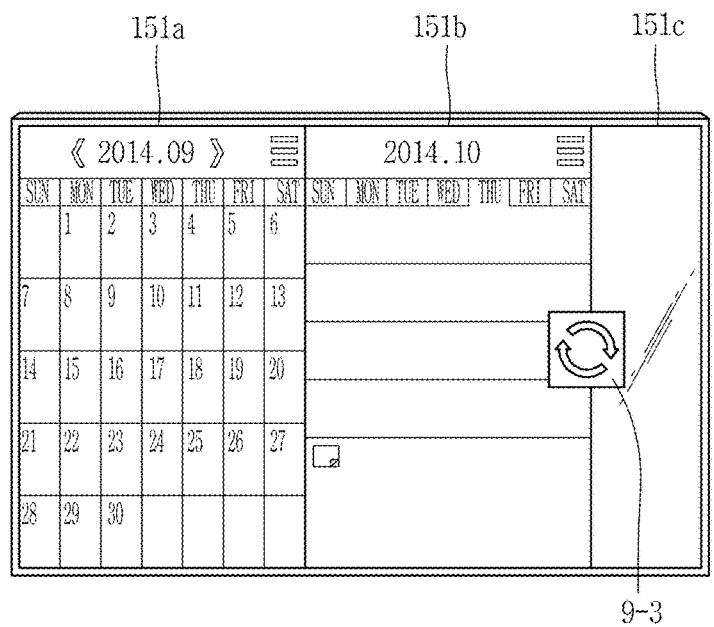

FIGS. 9A and 9B are exemplary views illustrating a still another method to display contents on the divided flexible display unit according to embodiments of the present invention.

As shown in FIGS. 9A and 9B, when a users touch input 9-2 is applied to the third display region 151c and the first and second display regions 151a and 151b are folded inward and outward in a state where an application 9-1 such as a calendar, an address book, a messenger, and the like, which is able to be synchronized, is displayed on the first and second display regions 151a and 151b (or, the entire screen) of the flexible display unit 151 by a user's request, the control unit 180 is configured to synchronize the application 9-1.

The control unit 180 may be configured to display notification information 9-3 informing that the application 9-1 is being currently synchronized when synchronizing the application 9-1, on more than one of the first through third display regions 151a-151c.

FIGS. 10A through 10E are exemplary views illustrating still another method to display contents on the divided flexible display unit according to embodiments of the present invention.

Figure 10A:
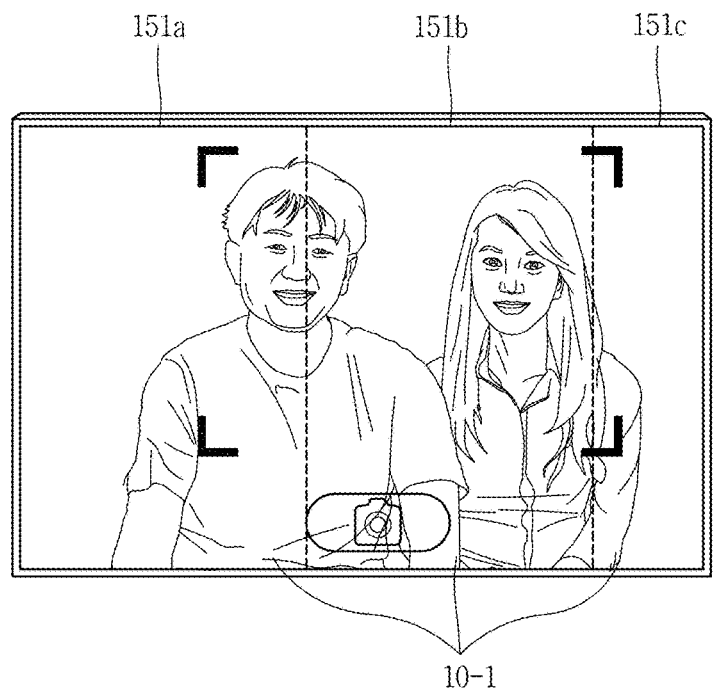
Figure 10B:
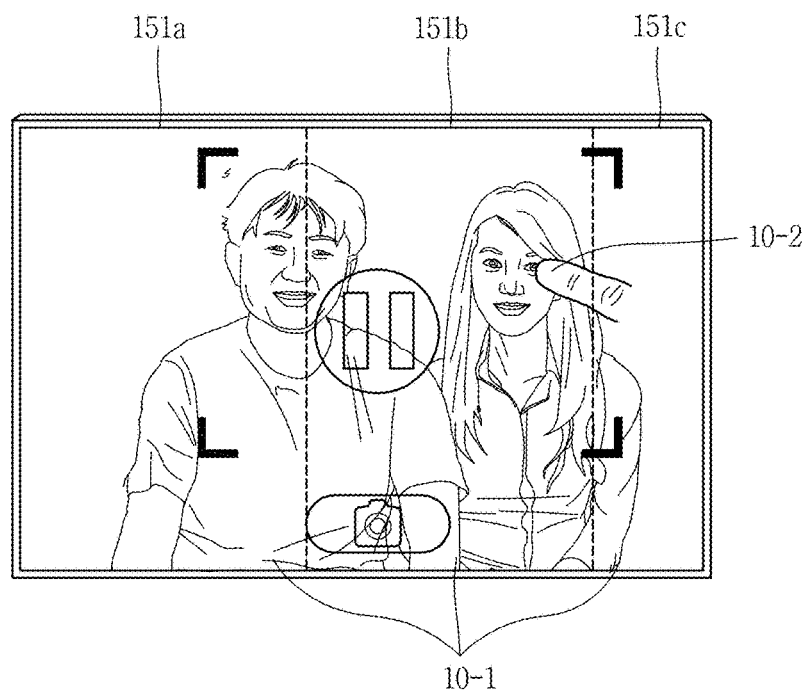
Figure 10C:
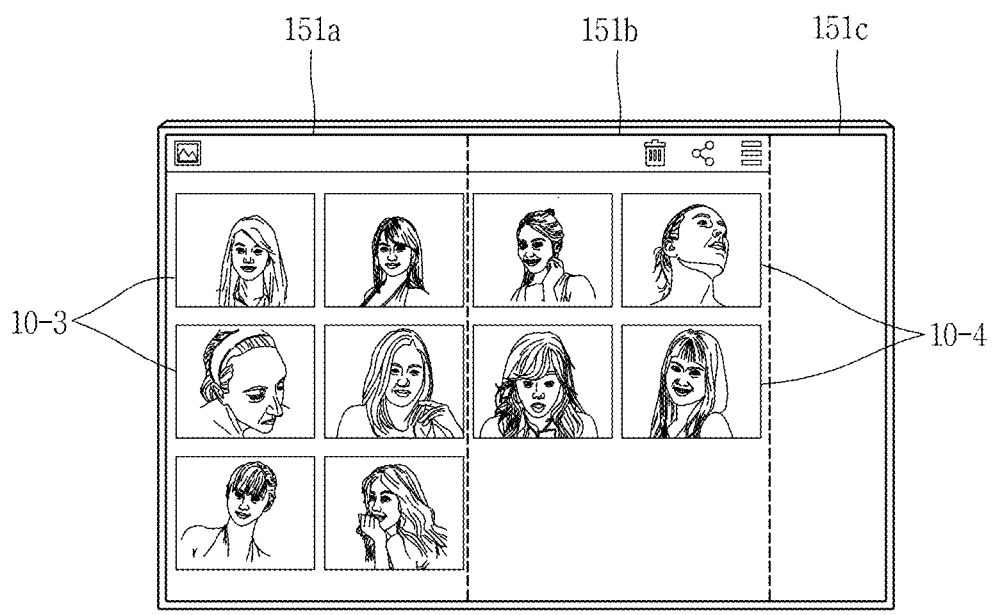

As shown in FIGS. 10A through 10C, when a user's touch input 10-2 is applied to a specific image within a preview image 10-1 and the first and second display regions 151a and 151b are folded inward or outward in a state where the preview image 10-1 captured by a camera 121 is displayed on the first and second display regions 151a and 151b (or, the entire screen) of the flexible display unit 151, the control unit may receive an image related to the specific image from a memory 170 or a server, and display the received image on the first and second display regions 151a and 151b (or, the entire screen).

When the first and second display regions 151a and 151b are folded inward or outward in a state where the preview image 10-1 captured by the camera 121 is displayed on the first and second display regions 151a and 151b (or, the entire screen) of the flexible display unit 151, the control unit may be configured to receive a first image 10-3 related to an image (for instance, portraits) displayed on the first display region 151a from the memory 170 or the server, display the received first image 10-3 on the first display region 151a, receive a second image 10-4 related to an image (for instance, portraits) displayed on the second display region 151b from the memory 170 or the server, and display the received second image 10-4 on the second display region 151b.

The control unit 180 may be configured to divide the preview image into first and second preview images, display the first preview image on the first display region 151a, and display the second preview image on the second display region 151b when the first and second display regions 151a and 151b are folded inward or outward in a state where the preview image 10-1 captured by the camera 121 is displayed on the first and second display regions 151a and 151b of the flexible display unit 151.

Figure 10D:
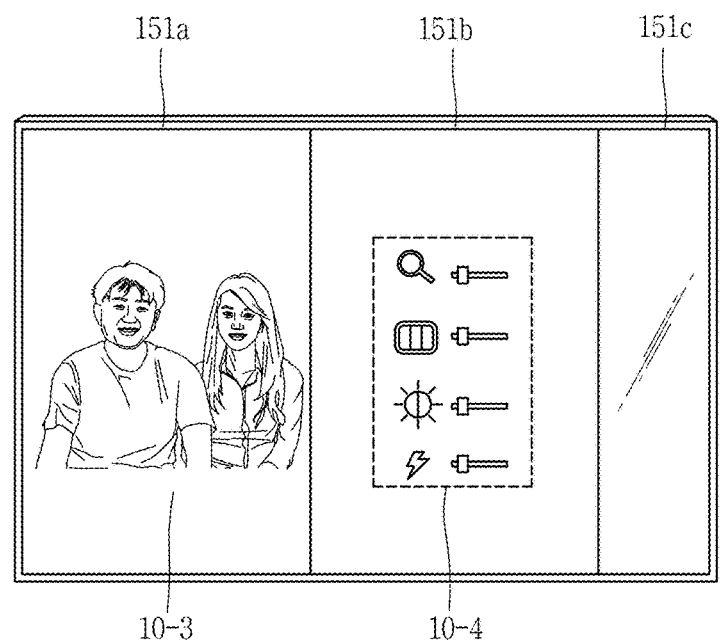

As shown in FIG. 10D, the control unit 180 may be configured to resize the preview image in correspondence to a screen size of the first display region 151a, display the resized preview image 10-3 on the first display region 151a, and display a camera setting menu (for instance, a light setting menu, a brightness setting menu, a resolution setting menu, a timer setting menu, and the like) 10-4 on the second display region 151b or the second and third display regions 151b and 151c when the first and second display regions 151a and 151b are folded inward or outward in a state where the preview image 10-1 captured by a camera 121 is displayed on the first and second display regions 151a and 151b of the flexible display unit 151.

Figure 10E:
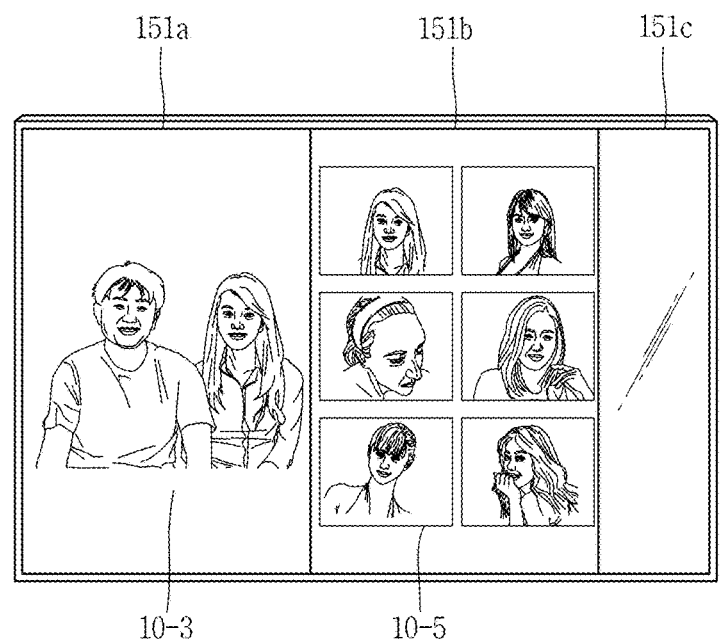

As shown in FIG. 10E, the control unit 180 may be configured to resize the preview image in correspondence to a screen size of the first display region 151a, display the resized preview image 10-3 on the first display region 151a, and display a first image 10-5 related to a preview image (for instance, a character image), or recently-captured images on the second display region 151b or the second and third display regions 151b and 151c when the first and second display regions 151a and 151b are folded inward or outward in a state where the preview image 10-1 captured by the camera 121 is displayed on the first and second display regions 151a and 151b of the flexible display unit 151.

Figure 11A:
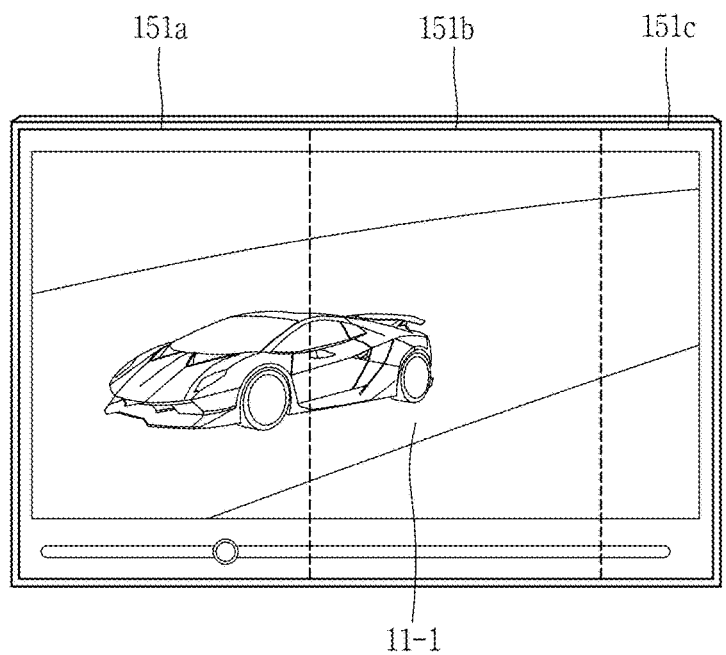
Figure 11B:
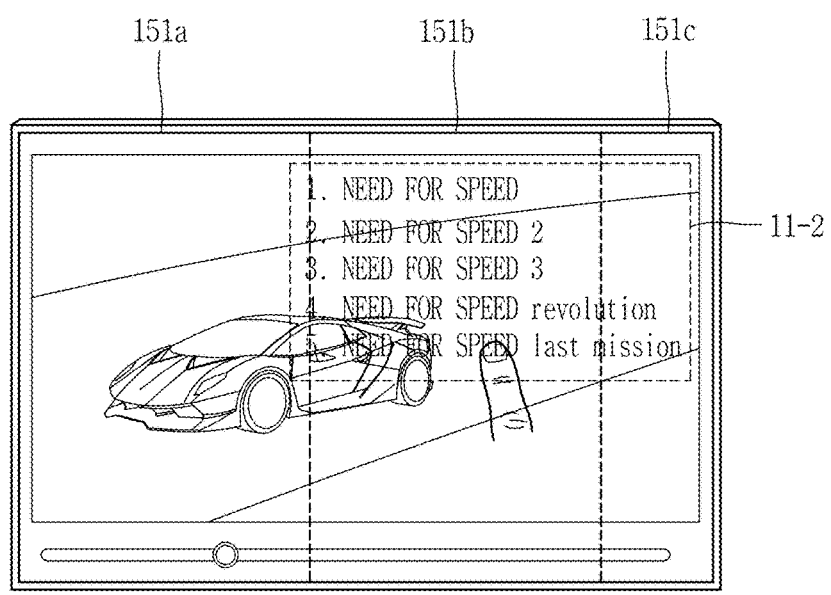
Figure 11C:
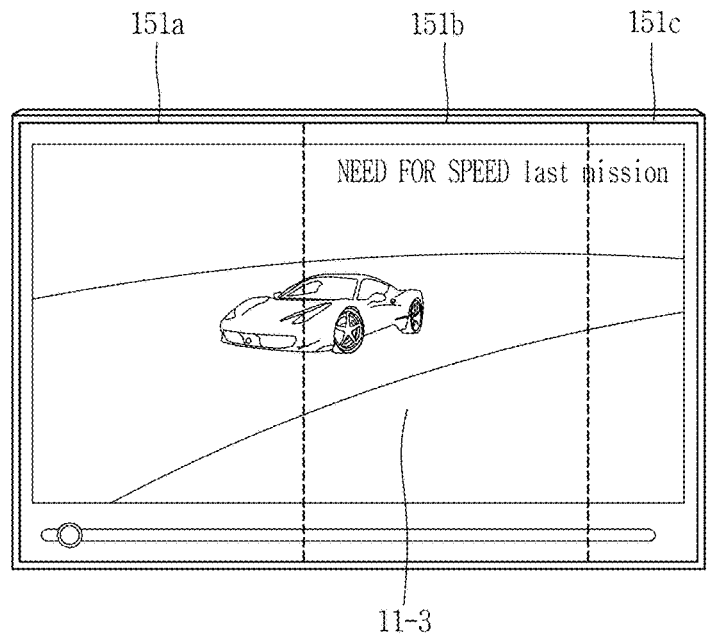

FIGS. 11A through 11C are exemplary views illustrating still another method to display contents on the divided flexible display unit according to embodiments of the present invention.

As shown in FIGS. 11A and 11B, the control unit 180 may be configured to search information related to a video 11-2 (for instance, character information in the video, movie series information, and the like) from the memory 170 or the server based on attribute information of the video, and display the searched information 11-2 on the second and/or third display region 151b and/or 151c when the first and second display regions 151a and 151b are folded inward or outward in a state where the video (for instance, a movie) 11-1 requested by a user is displayed on the first and second display regions 151a and 151b (or the entire screen) of the flexible display unit 151. The control unit 180 may be configured to display semi-transparently the searched information 11-2 on the second and/or third display regions 151*b* and/or 151*c* in a state where the video 11-1 is displayed on the entire screen. The received information 11-2 may be movie series information related to the video 11-1.

The control unit 180 may be configured to resize the video 11-1 in correspondence to a screen size of the first display region 151*a*, display the resized video 11-1 on the first display region 151*a*, and display the searched information 11-2 on the second and/or third display regions 151*b* and/or 151*c* when the first and second display regions 151*a* and 151*b* are folded inward or outward in a state where the video (for instance, a movie) 11-1 requested by a user is displayed on the first and second display regions 151*a* and 151*b* (or the entire screen) of the flexible display unit 151.

As shown in FIG. 11C, the control unit 180 may be configured to search for a video 11-3 corresponding to selected information when one of the information 11-2 (for instance, movie series information) is selected, and display the searched video 11-3 on the entire screen.

Figure 12A:
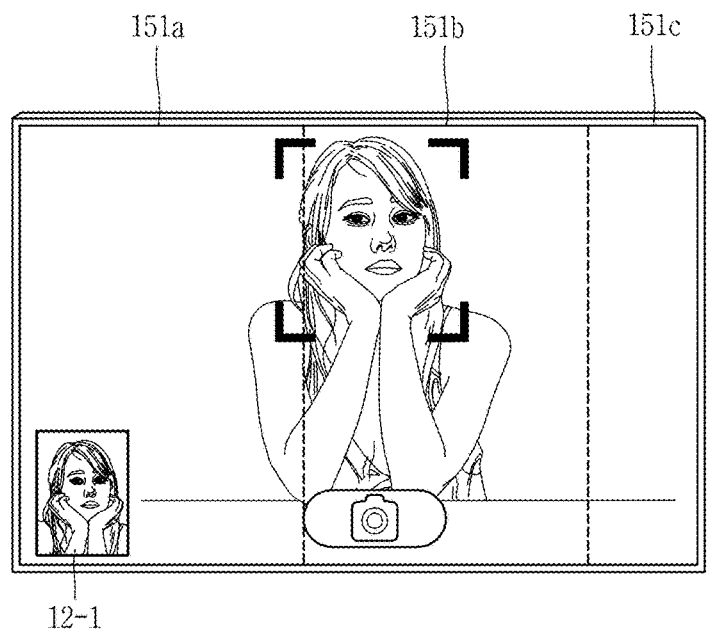
Figure 12B:
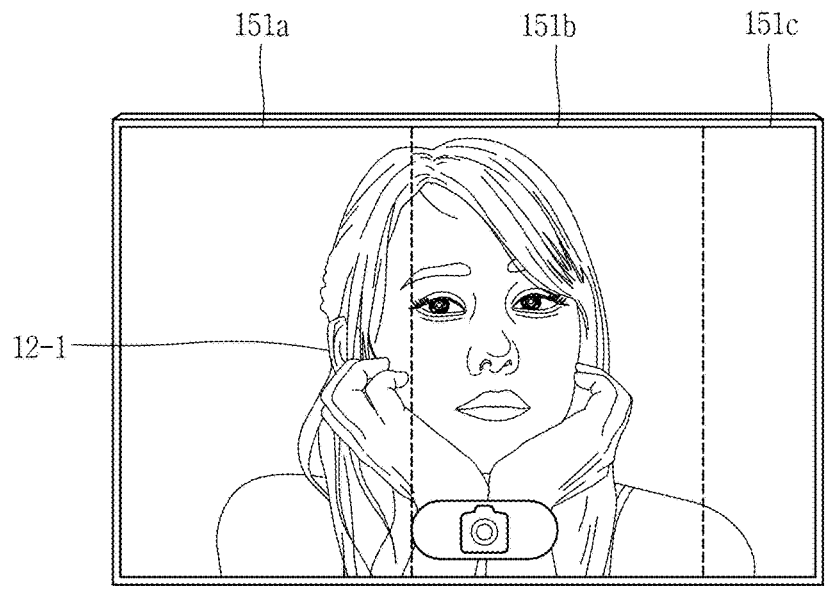
Figure 12C:
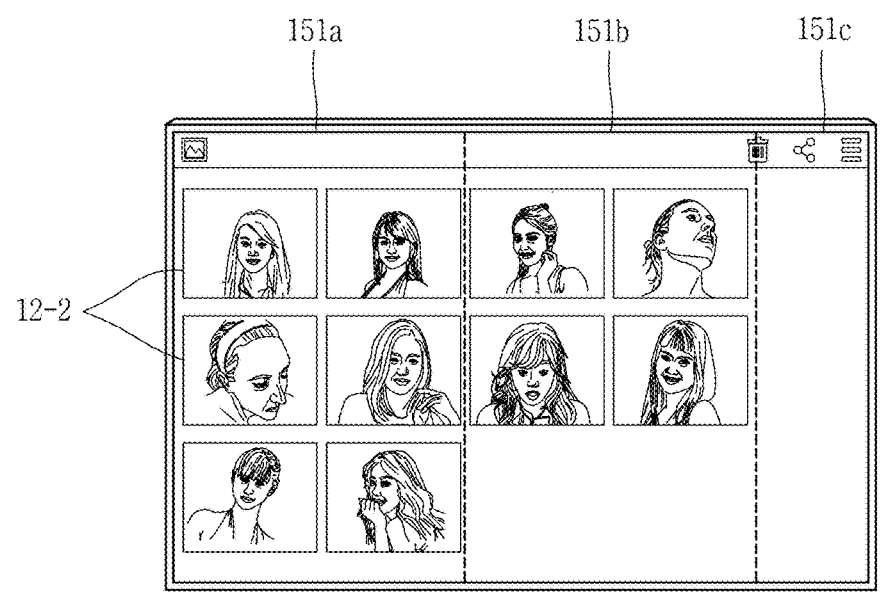

FIGS. 12A through 12C are exemplary views illustrating still another method to display contents on the divided flexible display unit according to embodiments of the present invention.

As shown in FIGS. 12A and 12B, the control unit 180 may be configured to display a recently-captured image 12-1 on the first and second display regions 151*a* and 151*b* (or, the entire screen) when the first and second display regions 151*a* and 151*b* are folded inward at a preset angle within a first preset time in a state where a preview image captured by the camera 121 is displayed on the first and second display regions 151*a* and 151*b* (or, the entire screen) of the flexible display unit 151.

As shown in FIG. 12C, the control unit 180 may be configured to display images 12-2 captured at the current position on the first and second display regions 151*a* and 151*b* (or, the entire screen) in an array when the first and second display regions 151*a* and 151*b* are folded inward at a preset angle within a second preset time in a state where a preview image captured by the camera 121 is displayed on the first and second display regions 151*a* and 151*b* (or, the entire screen) of the flexible display unit 151. The preset angle and the first and second preset times may be determined by a user or designer's intention.

The control unit 180 may be configured to return to its original state (a preview image is displayed on the first and second display regions (or, the entire screen)) when the first and second display regions 151*a* and 151*b* are folded outward in a state where the most recently captured image 12-1 or the images 12-2 have been displayed.

The control unit 180 may be configured to display a second internet page corresponding to a next tab of a first internet page on the second and third display regions 151*b* and 151*c* when the first display region 151*a* is touched by a user and the third display region 151*c* is folded inward or outward at a preset angle within a first preset time in a state where the first internet page is displayed on the second and third display regions 151*b* and 151*c* of the flexible display unit 151.

The control unit 180 may be configured to scroll up and down a screen of the first internet page when the first display region 151*a* is touched by a user and the third display region 151*c* is folded inward or outward at a preset angle within a second preset time in a state where the first internet page is displayed on the second and third display regions 151*b* and 151*c* of the flexible display unit 151.

The control unit 180 may be configured to display a next page of a specific page on the second and third display regions 151*b* and 151*c* when the first display region 151*a* is touched by a user and the third display region 151*c* is folded inward or outward at a preset angle within a first preset time in a state where the specific page of an electronic book is displayed on the second and third display regions 151*b* and 151*c* of the flexible display unit 151.

The control unit 180 may be configured to display a table of contents of the electronic book on the second and third display regions 151*b* and 151*c* when the first display region 151*a* is touched by a user and the third display region 151*c* is folded inward or outward at a preset angle within a second preset time in a state where the first internet page is displayed on the second and third display regions 151*b* and 151*c* of the flexible display unit 151.

Figure 13A:
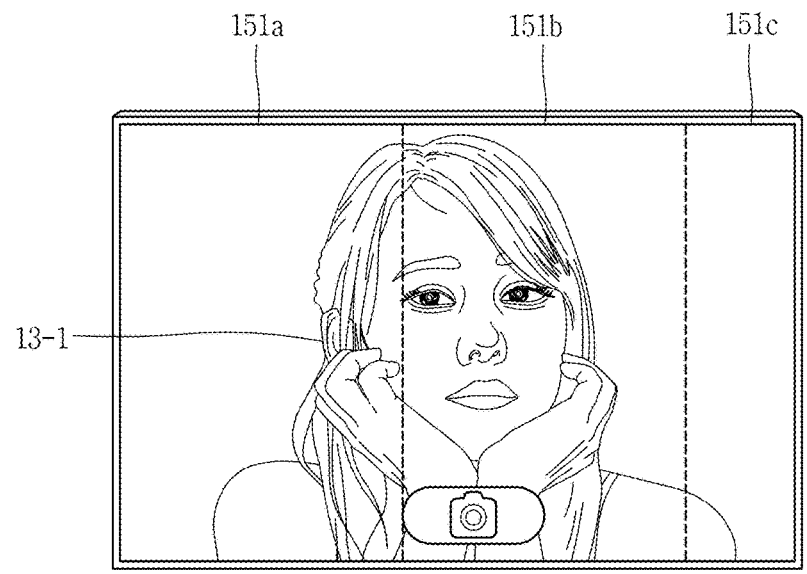
Figure 13B:
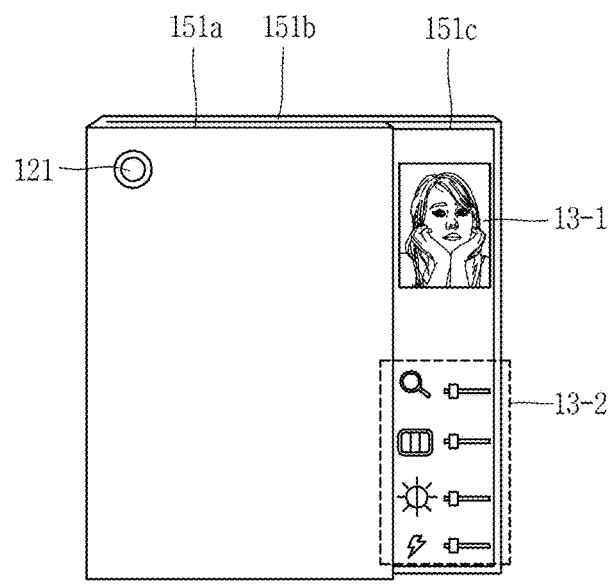

FIGS. 13A and 13B are exemplary views illustrating still another method to display contents on the divided flexible display unit according to embodiments of the present invention.

As shown in FIGS. 13A and 13B, the control unit 180 may be configured to turn off a screen of the first and second display regions 151*a* and 151*b*, and display a preview image 13-1 on the third display region 151*c* when the first and second display regions 151*a* and 151*b* are folded (for instance, the first and second display regions 151*a* and 151*b* become in contact with each other) in a state where the preview image 13-1 captured by the camera 121 is displayed on the first and second display regions 151*a* and 151*b* (or, the entire screen) of the display unit 151.

The control unit 180 may be configured to display a camera setting menu 13-2 (for instance, a light setting menu, a brightness setting menu, a resolution setting menu, a timer setting menu, and the like) on the third display region 151*c* when displaying the preview image 13-1 on the third display region 151*c*.

The control unit 180 may be configured to return to its original state (for instance, a state where a preview image is displayed on the first and second display regions 151*a* and 151*b* (or, the entire screen)) when the first and second display regions 151*a* and 151*b* are unfolded after being folded.

The control unit 180 may be configured to display the preview image 13-1 captured by the camera 121 on the first and second display regions 151*a* and 151*b* (or, the entire screen) of the flexible display unit 151 when a camera application is executed, and terminate the execution of the camera application and turn off the camera 121 when the first and second display regions 151*a* and 151*b* are folded (for instance, the first and second display regions 151*a* and 151*b* become in contact with each other).

Figure 14A:
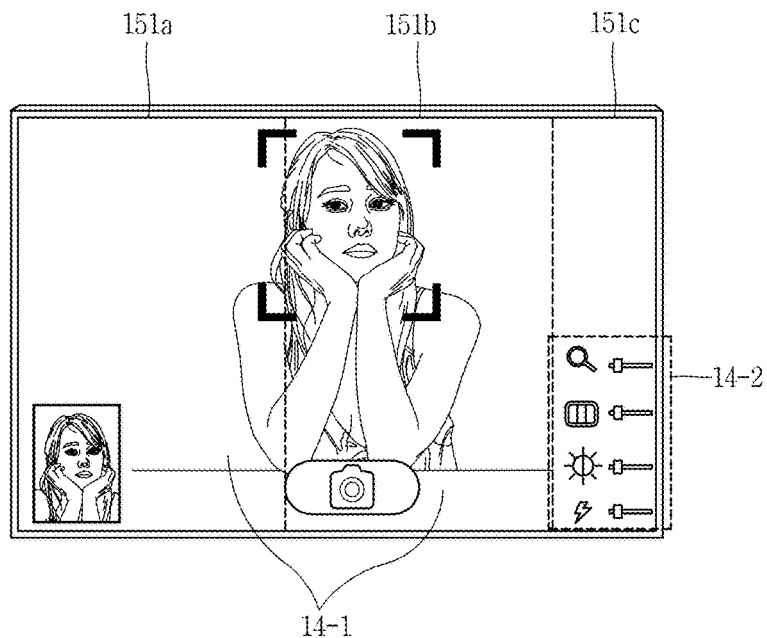
Figure 14B:
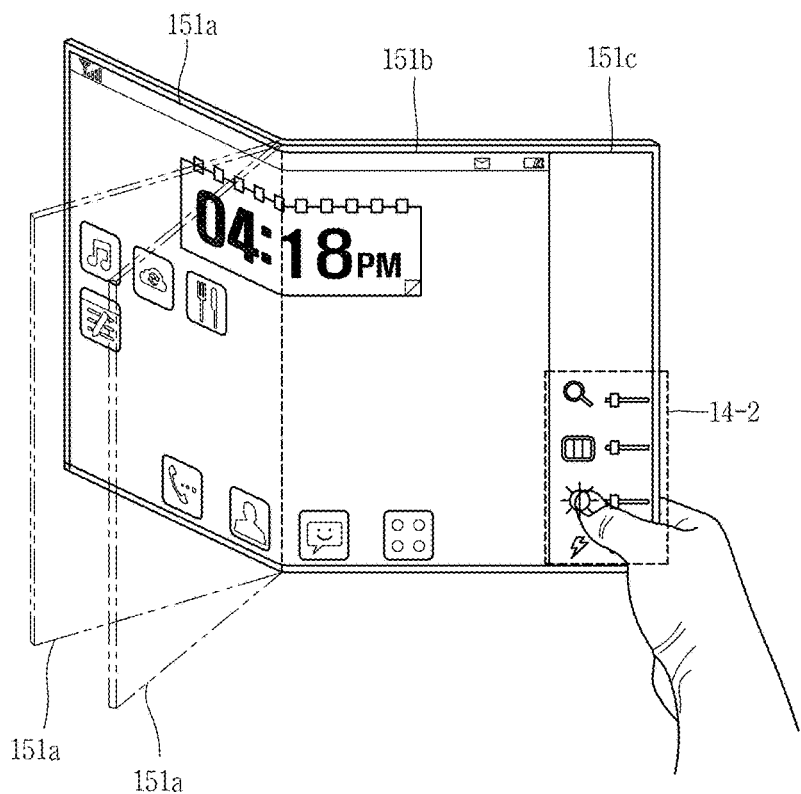

FIGS. 14A and 14B are exemplary views illustrating still another method to display contents on the divided flexible display unit according to embodiments of the present invention.

As shown in FIGS. 14A and 14B, the control unit 180 may be configured to display a preview image 14-1 captured by the camera 121 on the first and second display regions 151*a* and 151*b* of the flexible display unit 151, and when one of camera setting menus 14-2 is touched by a user and a folding angle of the first and second display regions 151*a* and 151*b* is changed in a state where the camera setting menus 14-2 (for instance, a light setting menu, a brightness setting menu, a resolution setting menu, a timer setting menu, and the like) have been displayed on the third display region 151*c*, control the menu touched by the user according to the changed folding angle.

For instance, the control unit 180 is configured to gradually increase a brightness value when a brightness setting menu for setting a brightness value is touched by a user and a folding angle of the first and second display regions 151*a* and 151*b* is gradually increased, and gradually decrease the brightness value when the folding angle of the first and second display regions 151*a* and 151*b* is gradually decreased, in a state where a preview image 14-1 captured by the camera 121 is displayed on the first and second display regions 151*a* and 151*b* of the flexible display unit 151 and camera setting menus 14-2 (for instance, a light setting menu, a brightness setting menu, a resolution setting menu, a timer setting menu, a camera shutter speed setting menu, and the like) have been displayed on the third display region 151*c*.

The control unit 180 is configured to gradually increase a time when a timer setting menu for setting a time is touched by a user and a folding angle of the first and second display regions 151*a* and 151*b* is gradually increased, and gradually decrease the time when the folding angle of the first and second display regions 151*a* and 151*b* is gradually decreased, in a state where the preview image 14-1 captured by the camera 121 is displayed on the first and second display regions 151*a* and 151*b* of the flexible display unit 151 and the camera setting menus 14-2 have been displayed on the third display region 151*c*. That is, the control unit 180 may be configured to change attribute information of contents according to a folding angle of the first and second display regions 151*a* and 151*b*.

The control unit 180 may be configured to control not only the camera setting menu 14-2, but a volume of video according to a folding angle of the first and second display regions 151*a* and 151*b*, or a folding angle of the second and third display regions 151*b* and 151*c*.

The control unit 180 is configured to gradually increase a camera shutter speed when a menu for setting a camera shutter speed is touched by a user and a folding angle of the first and second display regions 151*a* and 151*b* is gradually increased, and gradually decrease the camera shutter speed when the folding angle of the first and second display regions 151*a* and 151*b* is gradually decreased, in a state where the preview image 14-1 captured by the camera 121 is displayed on the first and second display regions 151*a* and 151*b* of the flexible display unit 151 and the camera setting menus 14-2 have been displayed on the third display region 151*c*.

FIGS. 15A through 15D are exemplary views illustrating still another method to display contents on the divided flexible display unit according to embodiments of the present invention.

Figure 15A:
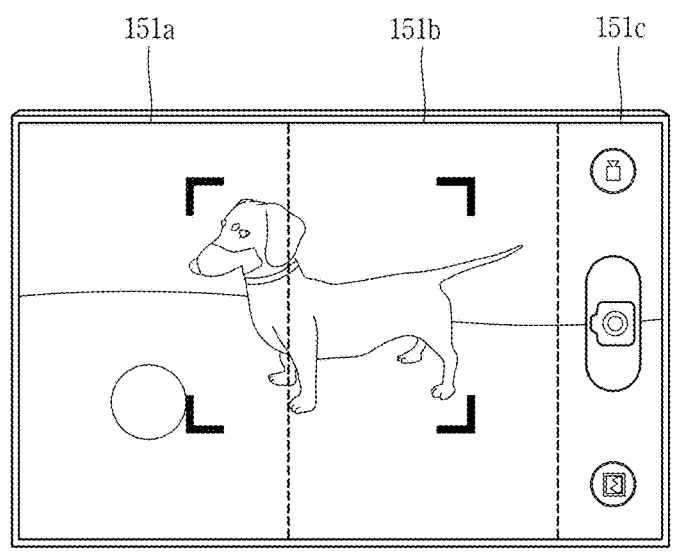
Figure 15B:
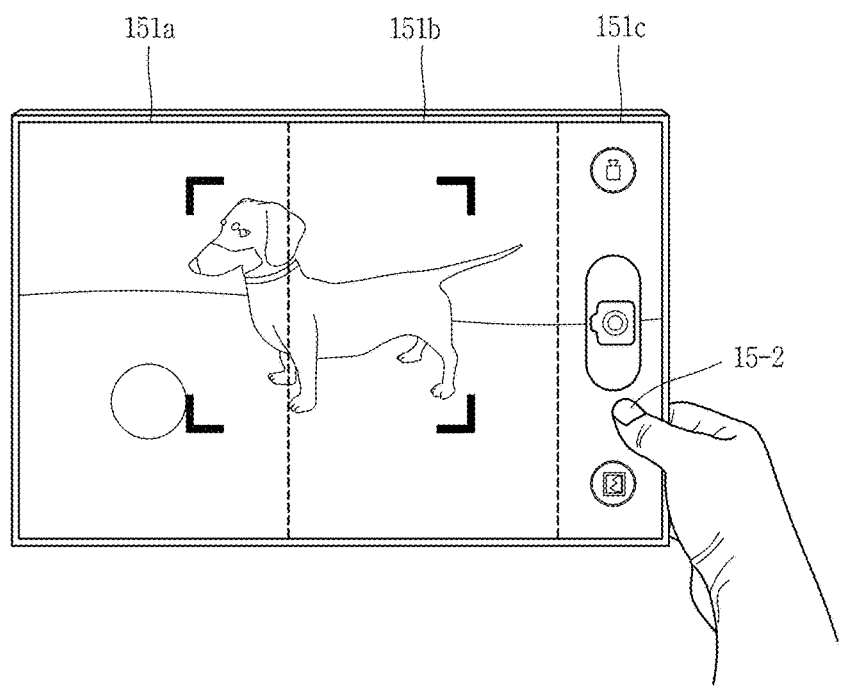

As shown in FIGS. 15A and 15B, the control unit 180 may be configured to display a preview image 15-1 captured by the camera 121 on the first and second display regions 151*a* and 151*b* (or, the entire screen) of the display unit 151 when a camera application is executed. The control unit 180 is configured to turn off a screen of the first and second display regions 151*a* and 151*b* and display an execution screen of the camera application on the third display region 151*c* when a user's touch input 15-2 is applied to the third display region 151*c* and the first display region 151*a* is folded in a predetermined pattern in a state where the preview image 15-1 is displayed on the first and second display regions 151*a* and 151*b* (or, the entire screen).

Figure 15C:
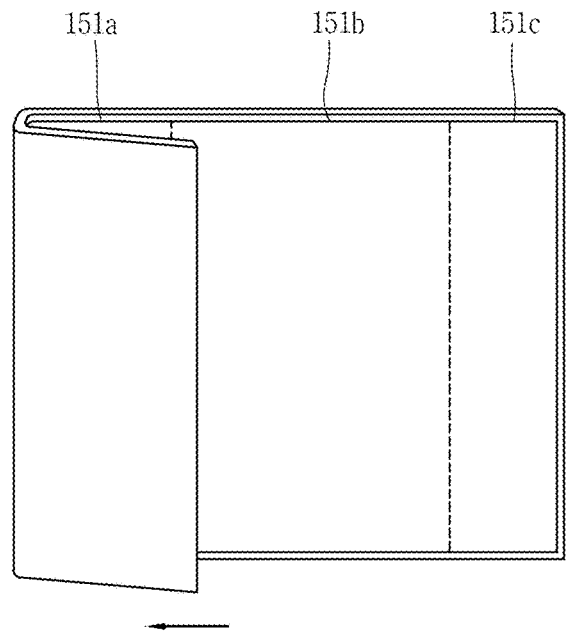
Figure 15D:
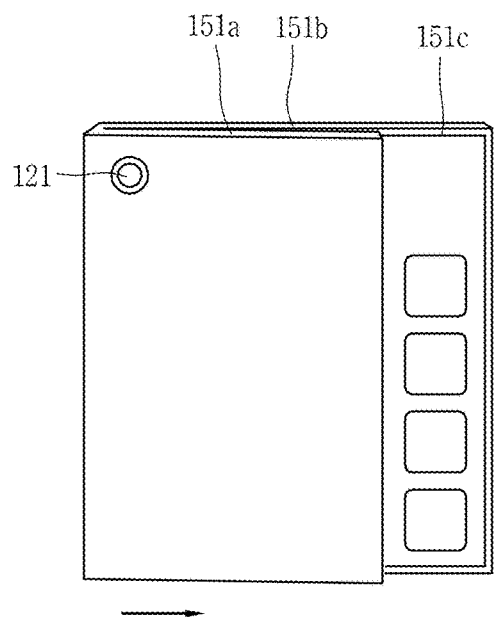

As shown in FIGS. 15C and 15D, the control unit 180 is configured to turn off a screen of the first and second display regions 151*a* and 151*b* when the first display region 151*a* is moved to the right after moving to the left in a folded state, and then is overlapped (to become in contact) with the second display region 151*b*. The control unit 180 may be configured to recognize, as a folding operation in a predetermined pattern, an operation that the first display region 151*a* is moved to the right after moving to the left in a folded state so that the first and second display regions 151*a* and 151*b* are overlapped (in contact) with each other.

The control unit 180 may be configured to display an execution screen of the camera application on the first and second display regions 151*a* and 151*b* (or, the entire screen) when the first display region 151*a* is unfolded in a state where the execution screen of the camera application displayed on the third display region 151*c* is touched by a user.

Figure 16A:
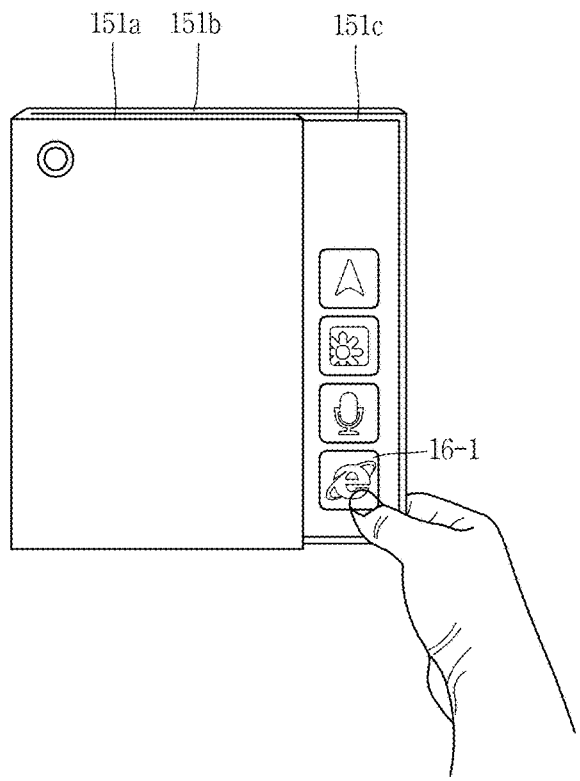
Figure 16B:
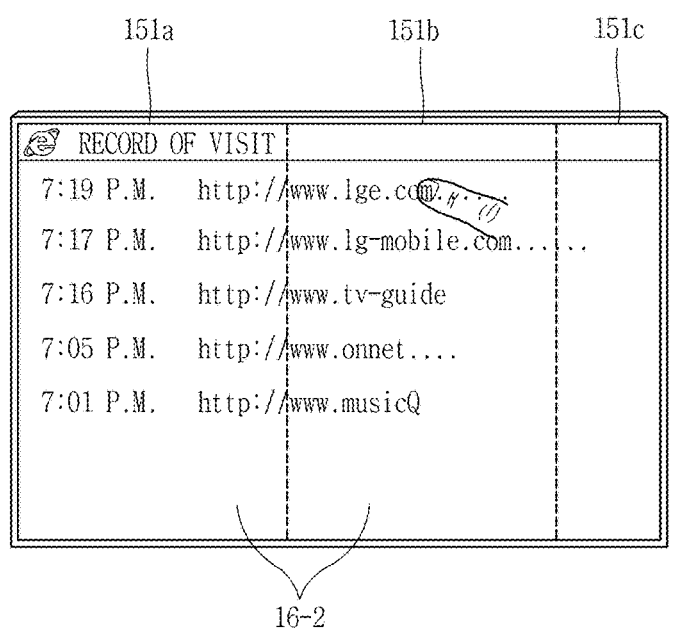
Figure 16C:
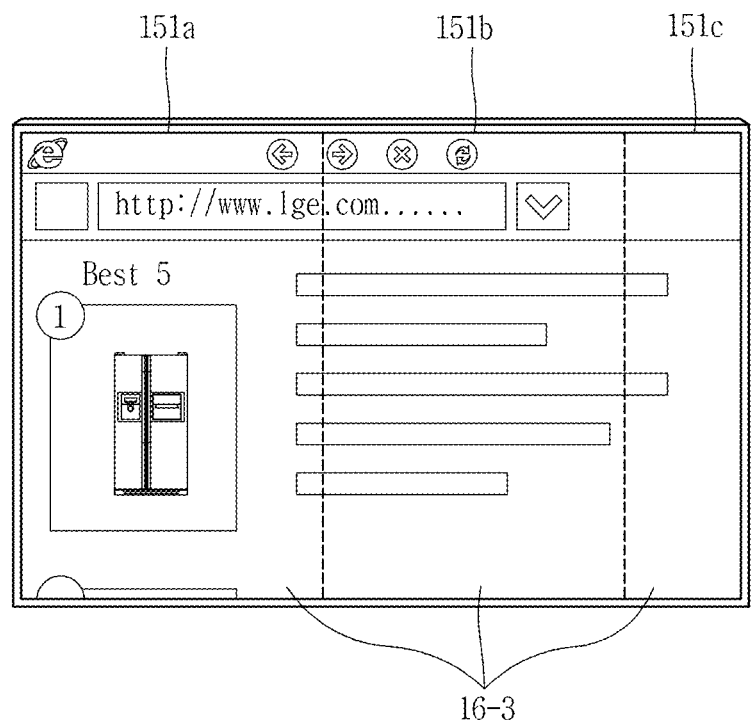

FIGS. 16A through 16C are exemplary views illustrating still another method to display contents on the divided flexible display unit according to embodiments of the present invention.

As shown in FIGS. 16A and 16B, the control unit 180 may be configured to display information related to a specific application on the first and second display regions 151*a* and 151*b* (or the entire screen) when the first and second display regions 151*a* and 151*b* are folded or unfolded in a state where an icon 16-1 (for instance, an internet application, a video application, a photo application, and the like) of the specific application displayed on the third display region 151*c* is touched by a user. For instance, the control unit 180 is configured to display a list 16-2 of recently-accessed internet addresses on the first and second display regions 151*a* and 151*b* (or the entire screen) when the first and second display regions 151*a* and 151*b* are unfolded to be flat in a state where the icon 16-1 of an internet application displayed on the third display region 151*c* is touched by a user.

The control unit 180 may be configured to display information related to a specific application on the second and third display regions 151*b* and 151*c* (or, the entire screen) when the second and third display regions 151*b* and 151*c* are folded or unfolded in a state where an icon (for instance, an internet application, a video application, a photo application, and the like) of the specific application displayed on the first display region 151*a* is touched by a user.

As shown in FIG. 16C, the control unit 180 is configured to display an internet page 16-3 corresponding to a selected specific internet address on the first and second display regions 151*a* and 151*b* (or, the entire screen) when the specific internet address is selected by a user from the list 16-2 of recently-accessed internet addresses.

The control unit 180 may be configured to display a list of videos which have been recently reproduced on the first and second display regions 151*a* and 151*b* (or, the entire screen) when the first and second display regions 151*a* and 151*b* are unfolded to be flat in a state where an icon of a video application displayed on the third display region 151*c* is touched by a user. The control unit 180 may be configured to display a selected specific video on the first and second display regions 151*a* and 151*b* (or, the entire screen) when the specific video is selected by a user from the list of videos which have been recently reproduced.

The control unit 180 may be configured to display photos which have been recently taken on the first and second display regions 151*a* and 151*b* (or, the entire screen) when the first and second display regions 151*a* and 151*b* are unfolded to be flat in a state where an icon of a photo application displayed on the third display region 151*c* is touched by a user. The control unit 180 may be configured to display a selected specific photo on the first and second display regions 151*a* and 151*b* (or, the entire screen) when the specific photo is selected by a user from the photos which have been recently taken.

Figure 17A:
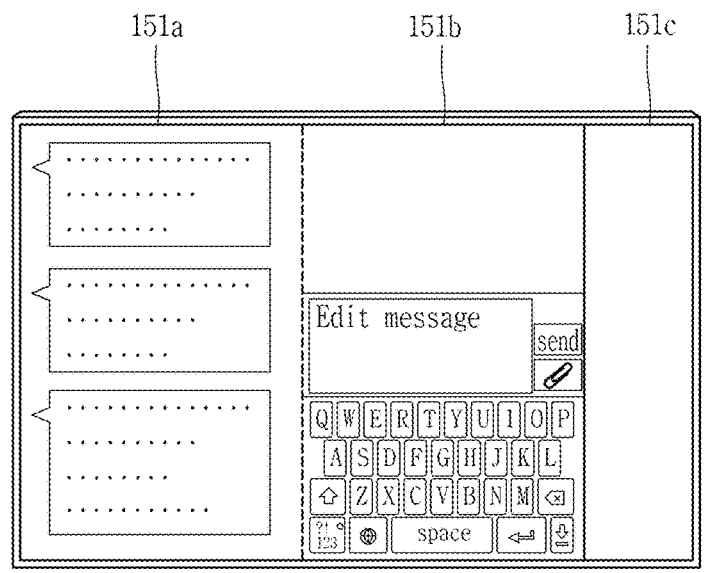
Figure 17B:
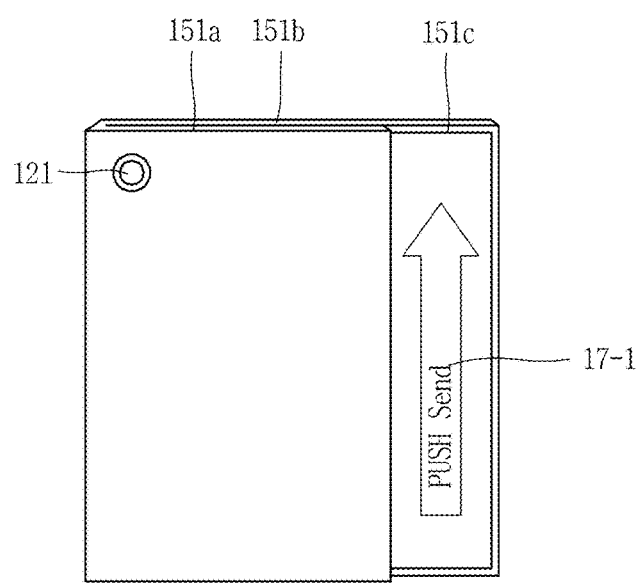

FIGS. 17A and 17B are exemplary views illustrating still another method to display contents on the divided display unit according to embodiments of the present invention.

As shown in FIGS. 17A and 17B, the control unit 180 may be configured to display an icon 17-1 to transmit or store a displayed user's input on the third display region 151c when the first display region 151a is folded (for instance, the first and second display regions 151a and 151b are in contact with each other) in a state where the user's input (for instance, a document, a memo, a message, and the like) is displayed on the first and second display regions 151a and 151b. For instance, the control unit is configured to display an icon 17-1 (for instance, a transmission icon, a storage icon, and the like) to transmit a user's input such as a document, a memo and a message to a corresponding server or corresponding mobile terminal or temporarily store in the memory 170, on the third display region 151c when the first display region 151a is folded (for instance, the first display region 151a becomes in contact with the second display region 151b) in a state where the user's input such as a document, a memo and a message is displayed on the first and second display regions 151a and 151b.

The control unit 180 may be configured to terminate execution of an application corresponding to the displayed document, memo, message, and the like when the second display region 151b is folded (for instance, the second display region 151b becomes in contact with the first display region 151a) in a state where the user's input such as a document, a memo and a message is displayed on the first and the second display regions 151a and 151b.

Figure 18A:
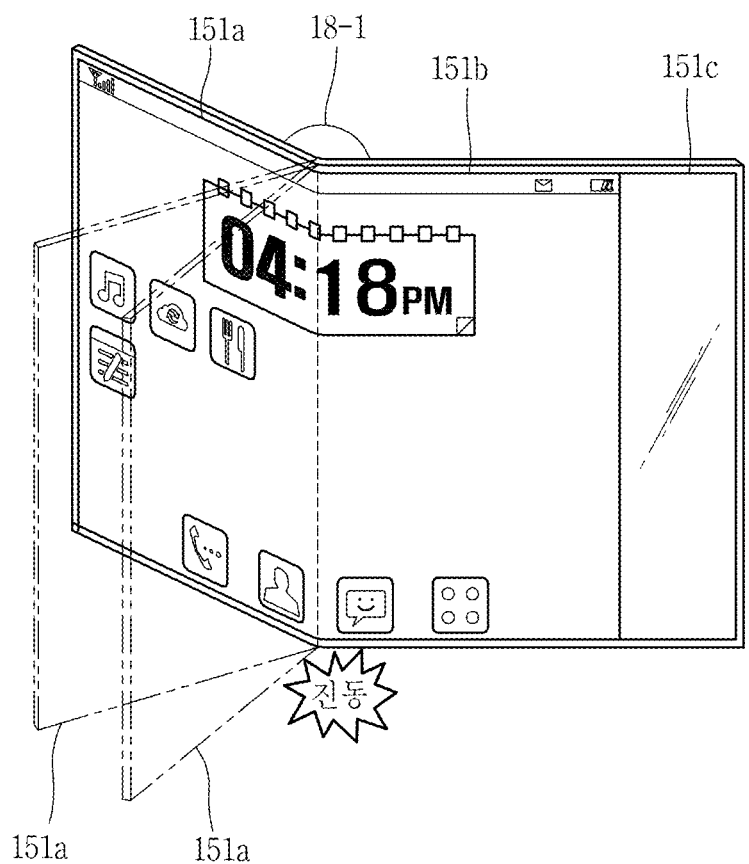
FIGS. 18A and 18B are exemplary views illustrating a method to output an alarm and/or a vibration in accordance with a folding angle of a flexible display unit according to an embodiment of the present invention.
Figure 18B:
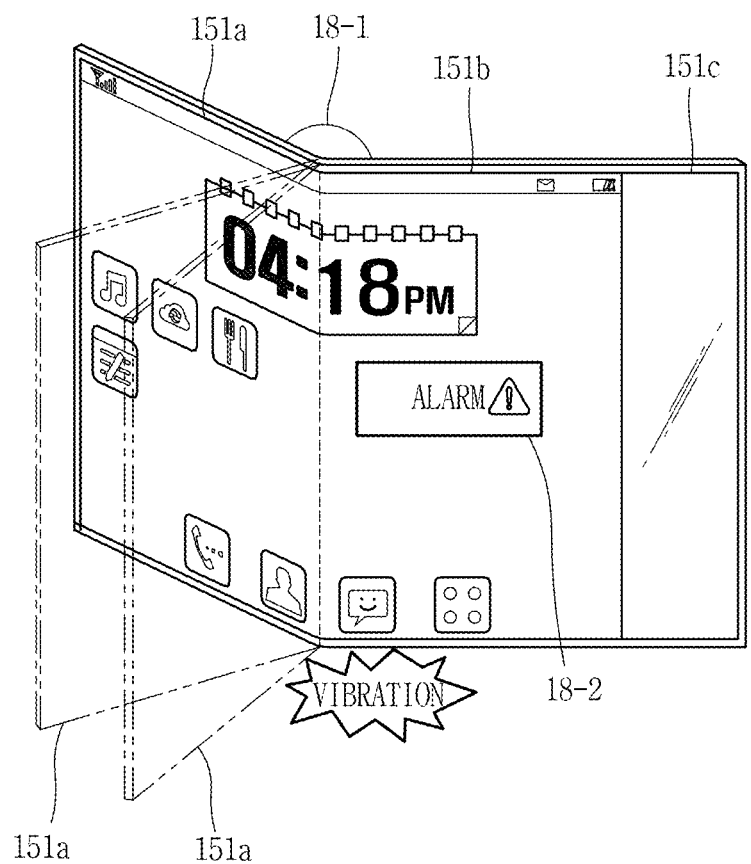

FIGS. 18A and 18B are exemplary views illustrating a method to output an alarm and/or a vibration in accordance with a folding angle of the flexible display unit according to embodiments of the present invention.

As shown in FIGS. 18A and 18B, the control unit 180 may be configured to sense a folding angle between the first and second display regions 151a and 151b (or, a folding angle between the second and third display regions 151b and 151c) through a sensing unit. The control unit 180 is configured to output a predetermined alarm sound and/or an alarm image when a folding angle between the first and second display regions 151a and 151b (or an angle between the second and third display regions 151b and 151c) is similar to or equal to a preset limit folding angle 18-1. The limit folding angle may be preset by a designer. The preset limit folding angle may be set to exceed 180°, assuming that a foldable angle of the first and second display regions 151a and 151b (or a foldable angle of the second and third display regions 151b and 151c) ranges from 0° to 180°.

For instance, the control unit may be configured to output a preset alarm sound through the sound output unit 152 when a folding angle between the first and second display regions 151a and 151b (or a folding angle between the second and third display regions 151b and 151c) is similar to or equal to the preset limit folding angle 18-1. The control unit may be configured to output a preset alarm image 18-2 on at least more than one of the first through third display regions 151a-151c when the folding angle between the first and second display regions 151a and 151b (or a folding angle between the second and third display regions 151b and 151c) is similar to or equal to the preset limit folding angle 18-1.

The control unit 180 may be configured to output a vibration by driving a vibration motor (not shown) located at a folded position of the first and second display regions 151a and 151b when the folding angle between the first and second display regions 151a and 151b is similar to or equal to the preset limit folding angle 18-1. The control unit 180 may be configured to output a vibration by driving a vibration motor (not shown) located at a folded position of the second and third display regions 151b and 151c when the folding angle between the second and third display regions 151b and 151c is similar to or equal to the preset limit folding angle 18-1.

As described above, the present invention is capable of implementing a computer readable code in a media in which programs are recorded. The computer readable media include all kinds of recording devices in which data readable by a computer system are stored. Examples of the computer readable media are a Hard Disk Drive (HDD), a Solid State Disk (SSD), a Silicon Disk Drive (SSD), a ROM, a RAM, a CD-ROM, a magnetic tape, a floppy disk, an optical data storage device, and include a type in the form of a carrier wave (for instance, transmission via internet). Further, the control unit 180 of the computer terminal may be included.

The foregoing embodiments and advantages are merely exemplary and are not to be considered as limiting the present disclosure. The present teachings can be readily applied to other types of apparatuses. This description is intended to be illustrative, and not to limit the scope of the claims. Many alternatives, modifications, and variations will be apparent to those skilled in the art. The features, structures, methods, and other characteristics of the exemplary embodiments described herein may be combined in various ways to obtain additional and/or alternative exemplary embodiments.

As the present features may be embodied in several forms without departing from the characteristics thereof, it should also be understood that the above-described embodiments are not limited by any of the details of the foregoing description, unless otherwise specified, but rather should be considered broadly within its scope as defined in the appended claims, and therefore all changes and modifications that fall within the metes and bounds of the claims, or equivalents of such metes and bounds are therefore intended to be embraced by the appended claims.

What is claimed is:

1. A mobile terminal, comprising:
   a flexible display unit configured to display information;
   a sensing unit configured to sense a folded position of the display unit; and
   a control unit configured to control the display unit to:
   display image information on an entire screen;
   divide the entire screen into a plurality of screens based on the sensed folded position;
   rearrange the displayed image information according to the plurality of screens;
   display the rearranged image information on at least one of the plurality of screens;
   output a preset alarm sound or display an alarm image when a sensed folding angle of the display unit is within a preset folding angle range;
   display applications along a folding line corresponding to the sensed folded position;
   select one of the displayed applications; and
   display an execution image of the selected one of the displayed applications on one of the plurality of screens upon receiving a touch input to move the selected one of the displayed applications from the folding line to the one of the plurality of screens.

2. The mobile terminal of claim 1, wherein:
the sensing unit is further configured to sense a folded direction of the display unit; and
the control unit is further configured to control the display unit to enlarge or contract the displayed image information according to the sensed folded direction.

3. The mobile terminal of claim 1, wherein:
the image information is map data; and
the control unit is further configured to control the display unit to display a starting position on a first screen of the plurality of screens and a destination position on a second screen of the plurality of screens when the display unit is folded while the map data is displayed on the entire screen.

4. The mobile terminal of claim 1, wherein:
the image information is map data; and
the control unit is further configured to control the display unit to display a position of the mobile terminal on a first screen of the plurality of screens and a position of another mobile terminal on a second screen of the plurality of screens when the display unit is folded while the map data is displayed on the entire screen.

5. The mobile terminal of claim 1, wherein the control unit is further configured to control the display unit to display a first calendar on a first screen of the plurality of screens and a second calendar on a second screen of the plurality of screens when the display unit is folded while the first calendar is displayed on the entire screen.

6. The mobile terminal of claim 5, wherein the control unit is further configured to control the display unit to display the first calendar on the entire screen when the display unit is refolded while the first calendar is displayed on the first screen of the plurality of screens and the second calendar is displayed on the second screen of the plurality of screens.

7. The mobile terminal of claim 1, wherein the control unit is further configured to control the display unit to display a preview image captured by a camera on a first screen of the plurality of screens and at least one image related to a specific image on a second screen of the plurality of screens when the specific image is selected within the preview image and the display unit is folded while the preview image is displayed on the entire screen.

8. The mobile terminal of claim 1, wherein the control unit is further configured to control the display unit to display a recently-captured image on either the entire screen or the plurality of screens when the display unit is folded at a first preset angle within a first preset time while a preview image captured by a camera is displayed on the entire screen.

9. The mobile terminal of claim 8, wherein the control unit is further configured to control the display unit to display an image captured at a current position of the mobile terminal on either the entire screen or one of the plurality of screens when the display unit is folded at a second preset angle within a second preset time while the preview image is displayed on the entire screen.

10. The mobile terminal of claim 1, wherein:
the plurality of screens include a first display screen, a second display screen and a third display screen; and
the control unit is further configured to control the display unit to turn off the first and second display screens and to display a preview image captured by a camera on the third display screen when the first and second display screens are folded while the preview image is displayed on the first, second and the third display screens.

11. The mobile terminal of claim 10, wherein the control unit is further configured to control the display unit to display the preview image only on the third display screen without turning the first and second display screens off when the first display screen is folded in a preset pattern and the third display screen is touched while the preview image is displayed on the first, second and third display screens.

12. The mobile terminal of claim 1, wherein the control unit is further configured to control the display unit to:
display a setting menu; and
change a setting value of the displayed setting menu according to a changed sensed folding angle of the display unit when the displayed setting menu is touched.

13. The mobile terminal of claim 1, wherein the setting menu is a camera setting menu.

14. The mobile terminal of claim 1, wherein the control unit is further configured to change a volume of music or displayed video according to a sensed changed folding angle of the display unit when a displayed volume control icon is touched.

15. The mobile terminal of claim 1, wherein:
the plurality of screens comprise a plurality of display regions, and
the control unit is further configured to control the display unit to display information related to an application on at least a first display region of the plurality of display regions when second and third display regions of the plurality of display regions are folded or unfolded and an icon related to the application that is displayed on the first display region is touched.

16. The mobile terminal of claim 1, wherein:
the plurality of screens includes a plurality of display regions;
the control unit is further configured to control the display unit to display an icon on a third display region of the plurality of display regions when first and second display regions of the plurality of display regions are folded while a user input is displayed on the first and second display regions; and
the icon is for transmitting or storing the displayed user input.

17. The mobile terminal of claim 1, wherein:
the plurality of screens include a plurality of display regions; and
the control unit is further configured to control the display unit to output the preset alarm sound and display the alarm image on at least one display region of the plurality of display regions when the sensed folding angle of the display unit is within the preset folding angle range.

18. The mobile terminal of claim 1, wherein:
the display unity comprises a vibration motor; and
the control unit is further configured to drive the vibration motor when the sensed folding angle of the display unit is within the preset folding angle range.

19. A control method of a mobile terminal, the method comprising:
displaying image information on entire screen of a flexible display unit;
sensing a folded position of the display unit;
dividing the entire screen into a plurality of screens based on the sensed folded position;
rearranging the displayed image information according to the plurality of divided screens;
displaying the rearranged image information on at least one of the plurality of screens; and outputting a preset alarm sound or display an alarm image when a sensed folding angle of the display unit is within a preset folding angle range;
displaying applications along a folding line corresponding to the sensed folded position;
selecting one of the displayed applications; and
displaying an execution image of the selected one of the displayed applications on one of the plurality of screens upon receiving a touch input to move the selected one of the displayed applications from the folding line to the one of the plurality of screens.

20. The method of claim 19, further comprising:
sensing a folded direction of the display unit; and
enlarge or contract the displayed image information according to the sensed folded direction.

* * * * *